United States Patent
Barcelos et al.

(10) Patent No.: US 10,107,000 B2
(45) Date of Patent: Oct. 23, 2018

(54) POOL CLEANER WITH OPTICAL OUT-OF-WATER AND DEBRIS DETECTION

(71) Applicant: Hayward Industries, Inc., Elizabeth, NJ (US)

(72) Inventors: Nathaniel Barcelos, Clemmons, NC (US); Scott Teuscher, Advance, NC (US)

(73) Assignee: Hayward Industries, Inc., Elizabeth, NJ (US)

( * ) Notice: Subject to any disclaimer, the term of this patent is extended or adjusted under 35 U.S.C. 154(b) by 0 days.

(21) Appl. No.: 15/049,888

(22) Filed: Feb. 22, 2016

(65) Prior Publication Data

US 2016/0244988 A1 Aug. 25, 2016

Related U.S. Application Data

(60) Provisional application No. 62/120,066, filed on Feb. 24, 2015.

(51) Int. Cl.
*E04H 4/16* (2006.01)
*G05D 1/02* (2006.01)
*G01V 8/12* (2006.01)

(52) U.S. Cl.
CPC ......... *E04H 4/1654* (2013.01); *G05D 1/0242* (2013.01); *G01V 8/12* (2013.01); *G05D 2201/0203* (2013.01)

(58) Field of Classification Search
CPC ....... E04H 4/16; E04H 4/1654; E04H 4/1663; E04H 4/1672
USPC ................ 15/1.7; 210/167.1, 167.15, 167.16
See application file for complete search history.

(56) References Cited

U.S. PATENT DOCUMENTS

| 5,205,174 | A | 4/1993 | Silverman et al. |
| 5,894,130 | A | 4/1999 | Bach |
| 6,115,864 | A | 9/2000 | Davidsson et al. |
| 6,412,133 | B1 | 7/2002 | Erlich et al. |

(Continued)

FOREIGN PATENT DOCUMENTS

| AU | 2014274646 A1 | 7/2015 |
| EP | 2607573 A2 | 6/2013 |

(Continued)

OTHER PUBLICATIONS

European extended Search Report, dated Nov. 18, 2016, issued in connection with European Patent Application No. 2,971,408 (7 pages).

(Continued)

*Primary Examiner* — Mark Spisich
(74) *Attorney, Agent, or Firm* — McCarter & English, LLP

(57) ABSTRACT

Example embodiments of the present disclosure are directed to a robotic pool cleaner and a control system of a robotic pool cleaner having an optical sensor positioned relative to an intake pathway of the robotic cleaner to monitor a flow of material through the intake pathway. An output of an optical sensor of the robotic pool cleaner can be monitored by the control system of the robotic pool cleaner to determine whether a detectable level of debris is flowing through the intake pathway. The robotic pool cleaner can perform one or more operations in response to a determination that a detectable level of debris is flowing through the intake pathway based on the output of the optical sensor.

43 Claims, 17 Drawing Sheets

(56) References Cited

U.S. PATENT DOCUMENTS

| | | |
|---|---|---|
| 7,037,038 B1 | 5/2006 | Haski et al. |
| 7,123,746 B2 | 10/2006 | Meniere et al. |
| 7,875,173 B1 | 1/2011 | Barnes |
| 8,661,595 B2 | 3/2014 | Bemini |
| 8,742,364 B2 | 6/2014 | Boodaghians et al. |
| 8,771,504 B2 | 7/2014 | Mastio et al. |
| 9,260,323 B2 | 2/2016 | Boodaghians et al. |
| 9,388,595 B2 | 7/2016 | Durvasula et al. |
| 9,506,262 B2 | 11/2016 | Tavor et al. |
| 2001/0032809 A1 | 10/2001 | Henkin et al. |
| 2004/0025268 A1 | 2/2004 | Porat et al. |
| 2004/0040581 A1 | 3/2004 | Bruwer |
| 2006/0104720 A1 | 5/2006 | Haski et al. |
| 2007/0094817 A1* | 5/2007 | Stoltz .................. E04H 4/1636 15/1.7 |
| 2008/0106422 A1 | 5/2008 | Sparks et al. |
| 2009/0039286 A1 | 2/2009 | Colvin, Jr. et al. |
| 2009/0232701 A1 | 9/2009 | Porat |
| 2009/0301522 A1 | 12/2009 | Abehasera et al. |
| 2011/0020139 A1 | 1/2011 | Pichon et al. |
| 2011/0163233 A1 | 7/2011 | Ng et al. |
| 2011/0197932 A1 | 8/2011 | Mastio et al. |
| 2012/0006352 A1 | 1/2012 | Holappa et al. |
| 2012/0038316 A1 | 2/2012 | Elias et al. |
| 2012/0103365 A1 | 5/2012 | Sumonthee |
| 2012/0189491 A2 | 7/2012 | Porat |
| 2012/0222224 A1 | 9/2012 | Yoon et al. |
| 2012/0246862 A1 | 10/2012 | Landry et al. |
| 2013/0152970 A1 | 6/2013 | Porat |
| 2013/0153514 A1 | 6/2013 | Stern et al. |
| 2013/0269729 A1 | 10/2013 | Erlich et al. |
| 2013/0298350 A1 | 11/2013 | Schnittman et al. |
| 2013/0298650 A1 | 11/2013 | Miura |
| 2014/0009748 A1 | 1/2014 | Leonessa et al. |
| 2014/0230168 A1 | 8/2014 | Ben Dov et al. |
| 2014/0263087 A1 | 9/2014 | Renaud et al. |
| 2014/0292204 A1 | 10/2014 | Potucek et al. |
| 2015/0027960 A1 | 1/2015 | Hosler et al. |
| 2015/0191927 A1 | 7/2015 | Tavor et al. |
| 2016/0207204 A1 | 7/2016 | Teuscher et al. |
| 2016/0244988 A1 | 8/2016 | Barcelos et al. |

FOREIGN PATENT DOCUMENTS

| | | |
|---|---|---|
| EP | 1749139 B1 | 11/2014 |
| EP | 2821564 A2 | 1/2015 |
| EP | 2516774 B1 | 3/2016 |
| EP | 2835478 B1 | 4/2016 |
| WO | 2014/151267 A1 | 9/2014 |
| WO | 2016/137886 A1 | 9/2016 |

OTHER PUBLICATIONS

Office Action dated Apr. 7, 2016, issued in connection with U.S. Appl. No. 14/207,893 (18 pages).

Office Action dated May 10, 2017, issued in connection with U.S. Appl. No. 14/994,653 (6 pages).

Office Action dated May 31, 2017, issued in connection with U.S. Appl. No. 14/207,893 (17 pages).

U.S. Appl. No. 62/120,066 entitled "Pool Cleaner With Optical Out-Of-Water and Debris Detection", filed Feb. 24, 2015 (55 pages).

International Search Report of the International Searching Authority dated Aug. 21, 2014, issued in connection with International Application No. PCT/US2014/025320, corresponding to U.S. Appl. No. 14/207,893 (4 pages).

Written Opinion dated Aug. 21, 2014, issued in connection with International Application No. PCT/US2014/025320, corresponding to U.S. Appl. No. 14/207,893 (6 pages).

Office Action dated Jan. 23, 2017, issued in connection with U.S. Appl. No. 14/994,653 (6 pages).

Third Party Submission Under 37 CFR 1.290 dated Dec. 14, 2015, issued in connection with U.S. Appl. No. 14/207,893 (5 pages).

Office Action dated Nov. 16, 2016, issued in connection with U.S. Appl. No. 14/207,893 (16 pages).

International Search Report of the International Searching Authority dated May 3, 2016, issued in connection with International Application No. PCT/US2016/018933 (4 pages).

Written Opinion of the International Searching Authority dated May 3, 2016, issued in connection with International Application No. PCT/US2016/018933 (22 pages).

Extended European Search Report dated Aug. 28, 2018 in connection with European Patent Application No. 16756119.0 (9 pages).

\* cited by examiner

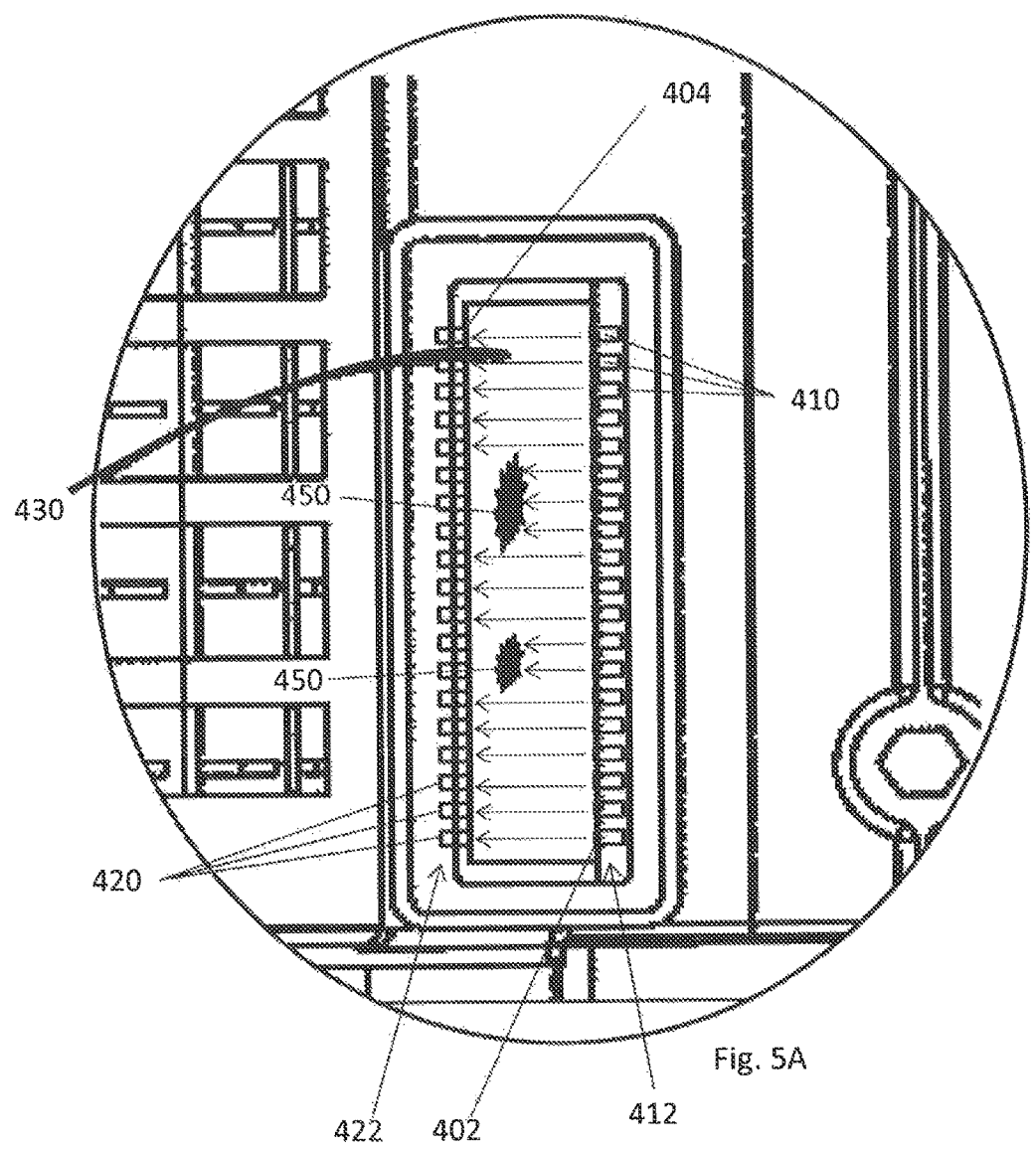

POOL CLEANER WITH OPTICAL OUT-OF-WATER AND DEBRIS DETECTION

CROSS REFERENCE TO RELATED APPLICATIONS

The present application claims priority to U.S. Provisional Application No. 62/120,066, filed on Feb. 24, 2015, the disclosure of which is incorporated by reference herein in its entirety.

TECHNICAL FIELD

Example embodiments of the present disclosure are related to a pool cleaner, and more particularly, to a pool cleaner configured for optical out-of-water detection and debris detection.

BACKGROUND

Pool cleaners for residential and commercial aquatic environments often clean immersed surfaces having varying types of debris. For example, pool cleaners can pick up debris as fine as sand and as coarse as leaves and twigs. Additionally, some areas in a pool can include more debris than others. Known conventional pool cleaners are typically limited in their ability, if any, to detect when a pool cleaner is picking up debris and/or to determine what type of debris is being picked up.

SUMMARY

Example embodiments of the present disclosure are directed to a robotic pool cleaner and a control system for a robotic pool cleaner that is configured to use optical sensors to determine whether the robotic pool cleaner is at least partially out-of-water and/or to facilitate optical debris detection.

In accordance with embodiments of the present disclosure, a robotic pool cleaner configured to be submerged in water and to clean an immersed surface of a pool is disclosed. The robotic pool cleaner includes an intake pathway; a processing device; and an optical sensor operatively coupled to the processing device and positioned relative to the intake pathway. The intake pathway of the robotic pool cleaner is configured to receive water and debris as the robotic pool cleaner traverse the immersed surface of the pool. An output of the optical sensor corresponds to a composition of material flowing through the intake pathway, and the processing device is programmed to determine whether a detectable level of debris is flowing through the intake pathway of the robotic pool cleaner based on the output of the optical sensor.

In accordance with embodiments of the present disclosure a system for controlling a robotic pool cleaner configured to be submerged in water and to clean an immersed surface of a pool is disclosed. The control system includes an optical sensor, memory (e.g., a computer-readable medium) including firmware, and a processing device. The optical sensor is disposed relative to an intake pathway of the robotic pool cleaner. The intake pathway is configured to receive water and debris as the robotic pool cleaner traverses the immersed surface of the pool. The processing device is programmed to execute the firmware to receive an output of the optical sensor as an input, and to determine whether a detectable level of debris is flowing through the intake pathway of the robotic pool cleaner based on the output of the optical sensor.

In accordance with embodiments of the present disclosure, a method of detecting debris flowing through an intake pathway of a robotic pool cleaner is disclosed. The intake pathway is configured to receive water and debris as the robotic pool cleaner traverses an immersed surface of the pool. The method includes de-energizing a light emitter disposed proximate to the intake pathway of the robotic pool cleaner during a first measurement cycle; measuring an intensity of ambient light that is propagating through the water and is incident upon a light detector disposed proximate to the intake pathway during the first measurement cycle to generate a first output; energizing the light emitter during a second measurement cycle; measuring an intensity of ambient light and light output by the light emitter that is propagating through the water and is incident upon the light detector during the second measurement cycle to generate a second output; subtracting the first output from the second output to generate a differential mode output that reduces a common mode impact of the ambient light propagating through the water in the measurement; and determining whether a detectable level of debris is flowing through the intake pathway based on the differential mode output.

In accordance with embodiments of the present disclosure, a method of controlling an operation of a robotic pool cleaner configured to be submerged in a pool, the robotic pool cleaner including an intake pathway configured to receive water and debris proximate to an immersed surface of a pool is disclosed. The method includes monitoring an output of an optical sensor of the robotic pool cleaner as the robotic pool cleaner traverses the immersed surface of the pool. The optical sensor is positioned relative to an intake pathway of the robotic pool cleaner to monitor a composition of material flowing through the intake pathway. The method further includes determining whether a detectable level of debris is flowing through the intake pathway in response to the output of the optical sensor; and performing one or more operations in response determining whether a detectable level of debris is flowing through the intake pathway.

In accordance with embodiments of the present disclosure, the optical sensor includes a light emitter operable to output light into the intake pathway; a light detector operable to detect the light output by the light emitted subsequent to the light passing through the intake pathway; a light emitter driver that energizes and de-energizes the light emitter in response to a light emitter sequence output by the processing device; an amplifier configured to receive a current corresponding to an intensity of light that is incident upon the light detector and output an amplified version of the electrical current; an integrator configured to receive the amplified electrical current from the amplifier and to integrate the electrical current until the integrator receives a discharge signal from the processing device and to output an integrated electrical current; and/or an analog-to-digital converter configured to receive the integrated electrical current and to sample the integrated electric current in response to a synchronization signal received by the analog-to-digital converter from the processing device. The analog-to-digital converter can output a quantified value corresponding to the light incident upon the light detector to the processing device, and the processing device can be programmed to determine whether a detectable level of debris is flowing through the intake pathway based on the quantified value.

In accordance with embodiments of the present disclosure the processing device can be programmed to de-energize the light emitter to measure a contribution of ambient light in the input of the optical sensor during an first measurement cycle, and to energize the light emitter to measure a contribution of the light input by the light emitter and the ambient light in the output of the optical sensor during the second measurement cycle. The processing device can be programmed to subtract the output of the first measurement cycle from the output of the second measurement cycle to generate a differential mode output that substantially reduces an effect of the ambient light on the determination of whether a detectable level of debris is flowing through the intake pathway.

In accordance with embodiments of the present disclosure, upon a determination that a detectable level of debris is flowing through the intake pathway, the processing device is programmed to determine the type of the debris that is flowing through the intake pathway.

In accordance with embodiments of the present disclosure, the processing device is programmed to determine whether air is flowing through the intake pathway based on the output of the optical sensor.

In accordance with embodiments of the present disclosure, the processing device is programmed to determine the type of debris that is flowing through the intake pathway based on one or more signatures of the output of the optical sensor. For example, the output of the optical sensor can be compared to the one or more signatures. The one or more signatures can be based on at least one of an amplitude of the output, a variability of the output, and/or a time varying characteristic of the output and can correspond to different types of debris. The type of debris includes at least one of leaves or sand. In some embodiments, a machine learning algorithm can be used to classify the output of the optical sensor as a type of debris flowing through the intake pathway.

In accordance with embodiments of the present disclosure, the processing device is programmed to determine an out-of-water condition based on a comparison of the output of the optical sensor to the one or more signatures.

In accordance with embodiments of the present disclosure, in response to determining that the detectable level of debris is flowing through the intake pathway, the processing device is configured to alter a movement of one or more wheels of the robotic pool cleaner; cause the pool cleaner to circle about a location of the pool associated with the detectable level of debris; increase a flow through the intake pathway; extend a cleaning time of a cleaning cycle, extend a cleaning time of future cleaning cycles, and/or increase a frequency with which the pool cleaner operates to clean the pool; and/or learn locations at which debris is detected.

In accordance with embodiments of the present disclosure, the robotic pool cleaner can include one or more image capturing devices operatively coupled to the processing device to capture images of surroundings of the pool cleaner as the pool cleaner traverses the immersed surface of the pool. The pool cleaner maps the pool based on the images captured by the one or more image capturing devices and the processing device can associate locations at which debris accumulates with the map.

In accordance with embodiments of the present disclosure, in response to determining that undetectable level of debris is flowing through the intake pathway, the processing device is configured to at least one of increase a drive speed or torque of one or more wheels of the robotic pool cleaner and/or change a direction of travel of the robotic pool cleaner.

In accordance with embodiments of the present disclosure, the robotic pool cleaner can include an amplifier operatively coupled to the optical sensor, the amplifier being configured to receive an electrical current output from the optical sensor and to output an amplified electrical current; an integrator operatively coupled to the amplifier, the amplifier being configured to receive the amplified electrical current from the amplifier and to integrate the electrical current; and an analog-to-digital converter operatively coupled to the integrator, the analog-to-digital converter being configured to receive the integrated electrical current, sample the integrated electric current, and output a quantified value corresponding the output of the optical sensor to the processing device. The processing device alternates between an ambient measurement cycle and a debris measurement cycle to control an operation of the optical sensor, the integrator, and the analog-to-digital converter.

In response to at least one of the ambient measurement cycle or the debris measurement cycle, the processing device is programmed to control the integrator to integrate the electrical current for a first specified time period; control the analog-to-digital converter to sample the integrated electrical at a specified sample time; discharge the integrator after the first specified time period, the integrator being discharged after or simultaneously with the specified sample time.

In response to at least one of the ambient measurement cycle or the debris measurement cycle, the integrator integrates the electrical current for a specified time period until the integrator receives a discharge signal from the processing device; and the analog-to-digital converter receives a synchronization signal from the processing device, and in response to the synchronization signal, samples the integrated output of the integrator at a specified sample time, the specified sample time occurring before or simultaneously with the receipt of the discharge signal by the integrator.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

FIG. 5A shows a more detailed view of one or the intake apertures illustrating an exemplary arrangement of the optical sensor with respect to the intake aperture.

DETAILED DESCRIPTION

According to the present disclosure, advantageous pool cleaning apparatus are provided that are configured with optical out-of-water detection and/or optical debris detection. More particularly, the present disclosure, includes, a robotic pool cleaner that can use one or more optical sensors to determine when the robotic pool cleaner is at least partially out-of-water and/or when the pool cleaner is picking up a detectable level of debris. The robotic pool cleaner can implement one or more actions based on one or more outputs signals from the optical sensor(s).

While example embodiments are illustrated in FIGS. 1-11, those skilled in the art will recognize that embodiments of the present disclosure are not limited to that which is illustrated in the FIGS. 1-11. Moreover, FIGS. 1-11 are provided for illustrative purposes and may not show common components and/or may represent such components schematically and/or as elements of a block diagram. For example, example embodiments of the pool cleaners described include a drive system which is illustrated schematically. One skilled in the art will recognize that such a drive system can include electric motors, pumps, water propulsion jets, gears, belts, drive shafts, and/or any other suitable components utilized in a drive system to drive one or more wheels (and/or impellers) of a pool cleaner. For purposes of the present disclosure, the terms "pool" and "spa" are used interchangeably.

Figure 1:
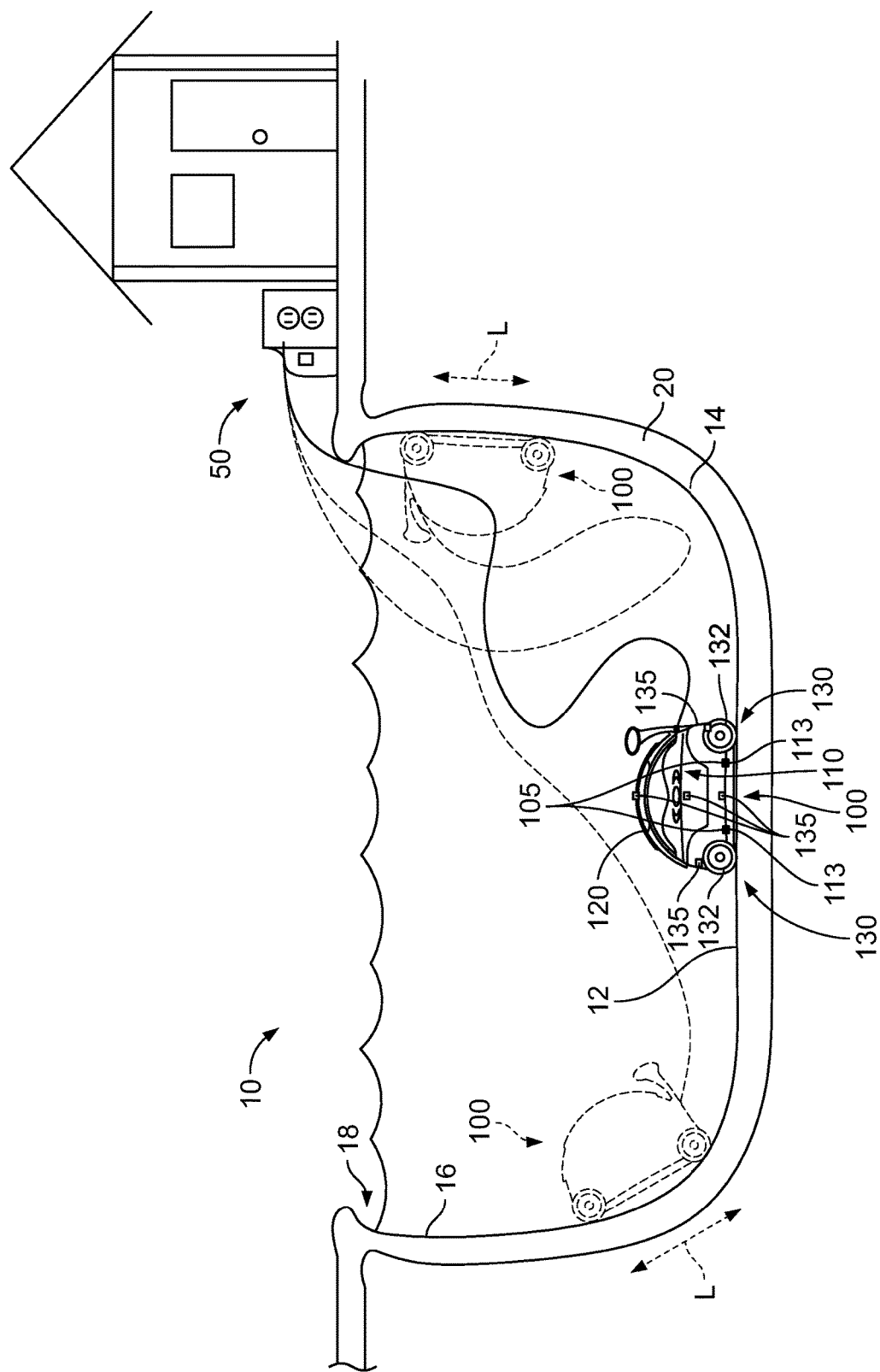
FIG. 1 depicts an example robotic pool cleaner in accordance with example embodiments of the present disclosure.
Figure 2:
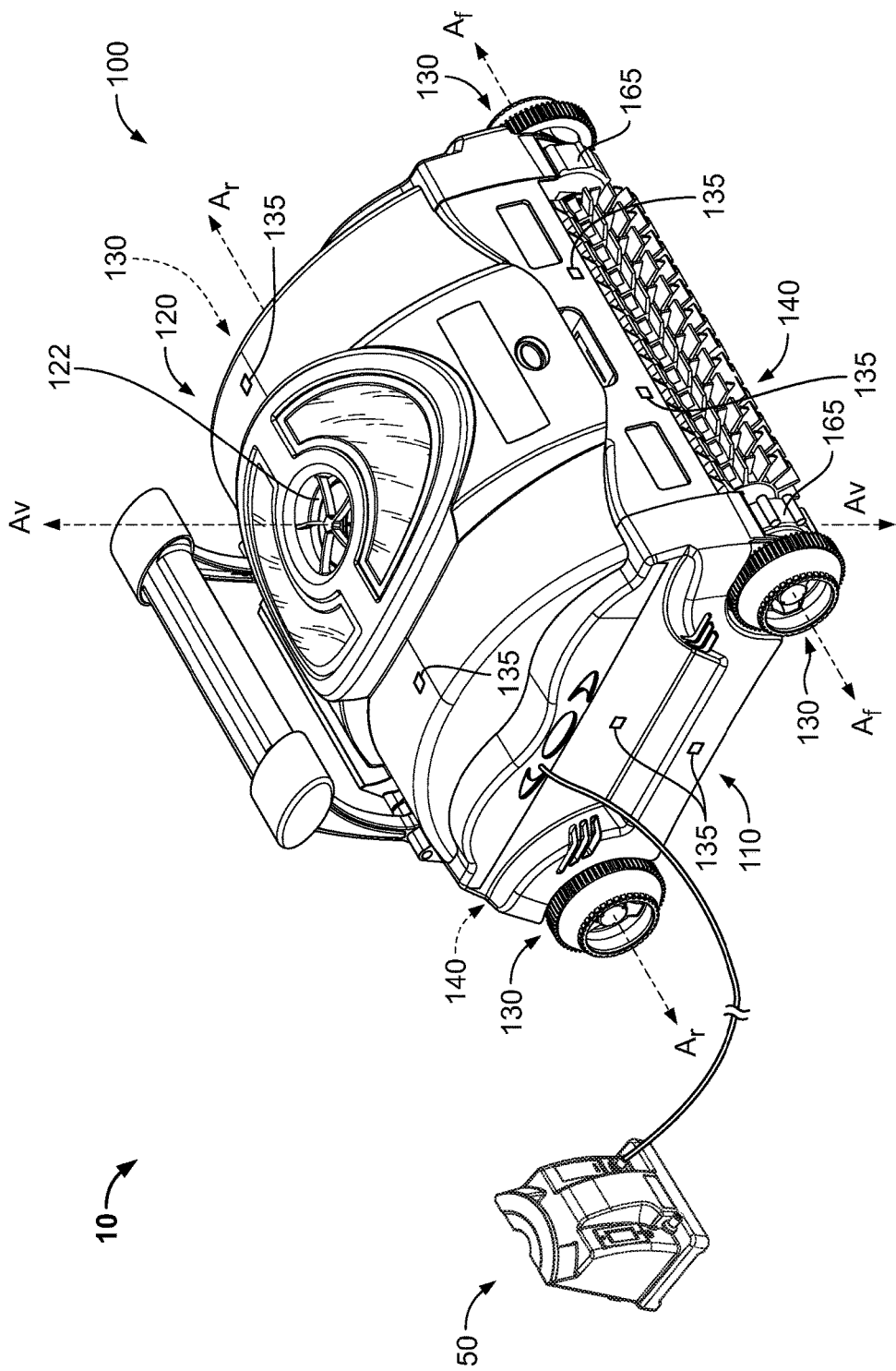
FIG. 2 depicts a perspective view of the robotic pool cleaner of FIG. 1.

FIG. 1 depicts an example robotic pool cleaner 100 in accordance with example embodiments of the present disclosure. FIG. 2 depicts a perspective view of the robotic pool cleaner 100 in accordance with example embodiments of the present disclosure. As shown in FIG. 1, the robotic pool cleaner 100 can be configured to clean horizontal, inclined/declined, and vertical surfaces 12, 14, and 16, respectively of a pool/spa 10 (e.g., by traversing the horizontal, inclined/declined, and vertical surfaces of the pool/spa 10). For example, the robotic pool cleaner 100 can be operated to clean immersed surfaces of a pool including bottom and side walls of the pool as well as stairs, benches, or other surface features, such as a shelf or platform, and can be operated to clean surfaces of a pool near a waterline 18 of the pool 10 (e.g., to clean side walls of the pool under, at, and/or above the water-air transition along the side walls).

Figure 3:
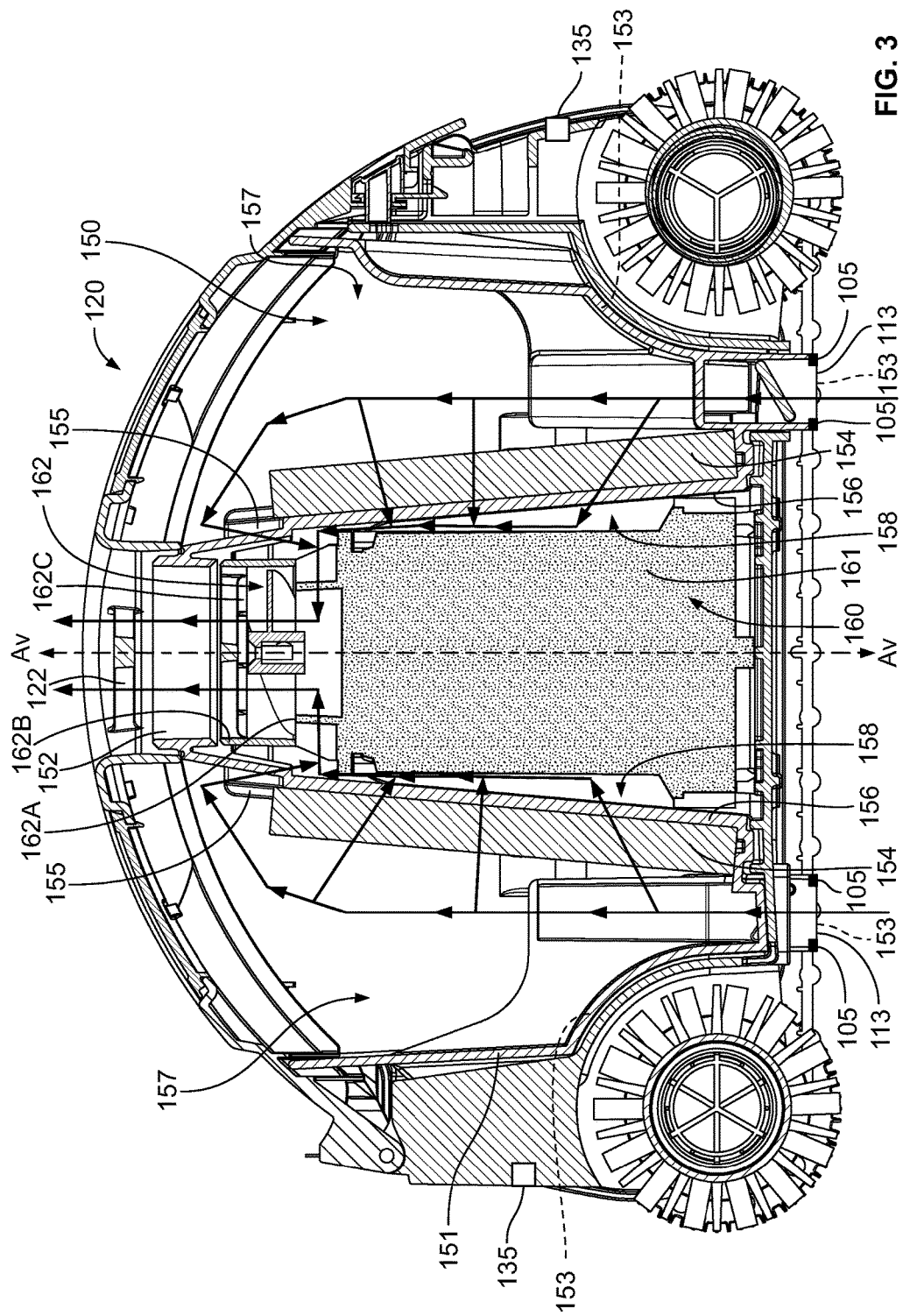
FIG. 3 depicts a cross-sectional view of an example embodiment of the robotic pool cleaner of FIG. 1.

Referring to FIGS. 1-3, the robotic pool cleaner 100 can generally be powered by a power source, such as an external power supply 50 or an internal power source (e.g., a battery), and can include a housing assembly 110, lid assembly 120, and wheel assemblies 130 as well as roller assemblies as described herein. An example robotic pool cleaner is shown, such as the type shown in U.S. Pat. No. 8,869,337 to Sumonthee, which is incorporated herein by reference, however, any pool cleaner is contemplated for the subject-matter of the present disclosure. The housing assembly 110 and lid assembly 120 cooperate to define one or more internal cavity spaces for housing internal components of the robotic pool cleaner 100 including, for example a filter assembly, a motor drive assembly, drive transfer system components, and navigation and control systems. The housing assembly 110 can extend along a longitudinal axis L, and typically includes filtration intake apertures 113 located, for example, on the bottom (underside) and/or side of the housing assembly 110. The intake apertures 113 are generally configured and dimensioned to correspond with openings, e.g., intake channels of a filter assembly supported within the housing assembly 110, as described in more detail herein. The intake apertures 113 and intake channels 153 (FIG. 3) can form intake pathways and can be sized to accommodate the passage of debris such as sand, leaves, twigs, etc., that has been entrained in water flowing through the intake channels 153. In example embodiments, intake apertures 113 may be included proximal to roller assemblies of the robotic pool cleaner 100 to facilitate the collection of debris and particles from the roller assemblies that have been entrained in the water flowing through the intake channels 153. The cleaner 100 is typically supported/propelled about a pool by wheels 132 of the wheel assemblies 130 located relative to the bottom of the robotic pool cleaner 100. The wheel assemblies 130 can be powered/driven by the motor drive system of the robotic pool cleaner 100 in conjunction with the drive transfer system, as discussed herein.

In example embodiments, the robotic pool cleaner 100 can be configured to determine whether at least of a portion of the robotic pool cleaner 100 is above the waterline 18 of the pool 10 in response to, at least in part, an output of optical sensor circuitry. For example, one or more optical sensors 105 including a light source and a light detector can be disposed proximate to the intake apertures 113 and/or at other positions along the intake pathways. The output of the light detector is responsive to changes in the materials flowing through the intake pathways. For example, the output of the optical sensors 105 can be affected by the introduction of air and/or debris flowing through the intake pathways. The robotic pool cleaner 100 can use the changes in the output of the optical sensors(s) 105 to control an operation of the robotic pool cleaner 100.

As one example, when it is determined that the robotic pool cleaner 100 is out-of-water (e.g., an out-of-water condition occurring when air is flowing through the intake pathways) based on an output of the optical sensor(s) 105, the robotic pool cleaner 100 can reverse its direction of travel; cease driving one or more wheels 132 (or wheel axles), brushes/rollers (or brush/roller axles), and/or impellers of the robotic pool cleaner 100; drive one or more wheels 132 (or wheel axles), brushes/rollers (or brush/roller axles), and/or impellers of the robotic pool cleaner 100 so that the robotic pool cleaner 100 oscillates about and along the waterline 18 of the pool 10; reduce or cease driving pumps of the robotic pool cleaner 100 to prevent damage to the pump motor due to excessive pump seal temperatures; and/or can control an operation of the robotic pool cleaner 100 to implement any suitable operations or actions.

As another example, when it is determined that a detectable level of debris is entrained in the water flowing through the intake pathways of the robotic pool cleaner 100 based on an output of the optical sensor(s) 105, the robotic pool cleaner 100 can cease or slow down driving one or more wheels 132 (or wheel axles) of the robotic pool cleaner 100 to allow the robotic pool cleaner to remain in one location to continue to intake the debris until the output of the optical sensor(s) 105 are indicative that the pool cleaner has picked up a substantial amount of the debris (e.g., the amount of debris being picked up is less than a detectable level of debris); drive one or more wheels 132 (or wheel axles) to circle about the location of the pool where the debris is detected; increase the rate and/or torque that the driving pumps of the robotic pool cleaner 100 to increase a flow through the intake apertures 113; and/or can control an operation of the robotic pool cleaner 100 to implement any suitable operations or actions. For example, in some embodiments, the pool cleaner can extend a cleaning time of the current cleaning cycle; can extend a cleaning time of future cleaning cycles; can increase the frequency with which it operates to clean the pool; learn where in the pool there is debris by mapping the pool using machine vision (e.g., by including cameras on the pool cleaner and using a machine vision function to map structures of the pool and then associate areas where debris accumulates to the map structure). A detectable level of debris can be a level of debris that exceeds a threshold level. As one non-limiting example, a detectable level of debris can be a threshold level of debris that can be detected based on the sensitivity and/or resolution of the optical sensors and/or the circuitry associated with the optical sensors.

As yet another example, when it is determined that a detectable level of debris is not flowing through intake pathways of the robotic pool cleaner 100 based on an output of the optical sensor(s) 105, the robotic pool cleaner 100 can increase a drive speed and/or torque of the one or more wheels 132 (or wheel axles) of the robotic pool cleaner 100 to allow the robotic pool cleaner to move to another location along the immersed surface of the pool until the output of the optical sensor(s) 105 are indicative that the pool cleaner is picking up debris; and/or change a direction of travel of the robotic pool cleaner 100.

In exemplary embodiments, when the pool cleaner 100 detects debris flowing through the intake pathways, the pool cleaner can be configured to determine what type of debris the pool cleaner is picking up. For example, the output of the optical sensors 105 can have different signatures based on the type of debris that is flowing through the intake pathways, and the pool cleaner 100 can compare the output of the optical sensor to the different signatures to identify the signature that most closely matches the type of debris.

In exemplary embodiments, the pool cleaner 100 can include one or more image capturing devices 135 (e.g., cameras) can be disposed on the pool cleaner 100 to capture images of the surroundings of the pool cleaner 100 as the pool cleaner traverses an immersed surface of the pool 10. For example, one or more image capturing devices 135 can be disposed on a front of the pool cleaner 100, on a rear of the pool cleaner 100, the sides of the pool cleaner 100, the bottom of the pool cleaner 100, and/or the top of the pool cleaner 100. The images captured by the image capturing devices 135 can be used by the pool cleaner 100 to map the pool 10 based on the content of the images (e.g., using machine vision). Using this approach, the images can be used by the pool cleaner 100 to identify where the pool cleaner 100 is in the pool 10 such that when the pool cleaner 100 is disposed at a certain location in the pool 10, the pool cleaner can perform one or more operations in response to recognizing that the pool cleaner 100 is at the certain position. As one example, based on a cleaning history and images captured during previous cleaning of the pool 10, the pool cleaner 100 can associate a location in the pool as determined by the images as typically having more debris than other locations in the pool based on the optical detection of debris performed by the pool cleaner 100. When the pool cleaner 100 is cleaning the pool and arrives at the location, e.g., based on a comparison images previously captured by the pool cleaner 100 to images that are contemporaneously captured by the pool cleaner 100, the pool cleaner 100 can deviate from a normal cleaning routine to improve the cleaning of the location (e.g., alter the speed at which the robotic cleaner travels, alter the movement of the pool cleaner 100, and the like).

Referring to FIG. 2, the robotic pool cleaner 100 can include roller assemblies 140 to scrub the walls of the pool during operation. In this regard, the roller assemblies 140 may include front and rear roller assemblies 140 operatively associated with said front and rear sets of wheel assemblies, respectively (e.g., wherein the front roller assembly 140 and front wheel assemblies 130 rotate in cooperation around axis $A_f$ and/or share a common axle, and the rear roller assembly 140 and rear wheel assemblies 130 rotate in cooperation around axis Ar and/or share a common axle). While the four-wheel, two-roller configuration discussed herein advantageously promotes device stability/drive efficiency, the current disclosure is not limited to such configuration. Indeed, three-wheel configurations (such as for a tricycle), six-wheel configurations, two-tread configurations (such as for a tank), tri-axial configurations, etc., may be appropriate, e.g. to achieve a better turn radius, or increase traction. Similarly, in example embodiments, the roller assemblies 140 may be independent from the wheel assemblies 130, e.g., with an autonomous axis of rotation and/or independent drive. Thus, the brush speed and/or brush direction may advantageously be adjusted, e.g., to optimize scrubbing.

As shown in FIG. 3, a filter assembly 150 is depicted in cross-section and the motor drive assembly 160 is depicted generally. The filter assembly 150 includes one or more filter elements (e.g., side filter panels 154 and top filter panels 155), a body 151 (e.g., walls, floor, etc.), and a frame 156 configured and dimensioned for supporting the one or more filter elements relative thereto. The body 151 and the frame 156 and/or filter elements generally cooperate to define a plurality of flow regions including at least one intake flow region 157 and at least one vent flow region 158. More particularly, each intake flow region 157 shares at least one common defining side with at least one vent flow region 158, wherein the common defining side is at least partially defined by the frame 156 and/or filter element(s) supported thereby. The filter elements, when positioned relative to the frame 156, form a semi-permeable barrier between each intake flow region 157 and at least one vent flow region 158.

In example embodiments, the body 151 defines at least one intake channel 153 extending from intake apertures 113 and in communication with each intake flow region 157, where the intake apertures 113 and intake channels 153 define the intake pathways of the cleaner 100. The frame 156 defines at least one vent channel 152 in communication with each vent flow region 158. Each intake flow region 157 defined by the body 151 can be bucket-shaped to facilitate trapping debris therein. For example, the body 151 and frame 156 may cooperate to define a plurality of surrounding walls and a floor for each intake flow region 157.

The body 151 of the filter assembly 150 is depicted with the frame 156 shown integrally formed therewith. The body 151 has a saddle-shaped elevation and is configured, sized, and/or dimensioned to fit within the housing assembly 110 and the frame 156 is configured, sized, and/or dimensioned to fit over the motor drive assembly 160. When the filter assembly 150 is positioned within the housing assembly 110, the motor drive assembly 160 in effect divides the original vent flow region 158 into a plurality of vent flow regions 158, with each of the vent flow regions 158 in fluid communication with the intake openings defined by the aperture support 162A of the impeller 162C. The motor drive assembly 160 generally includes a motor box 161 and an impeller unit 162. The impeller unit 162 is typically secured relative to the top of the motor box 161, e.g., by screws, bolts, etc.

In example embodiments, the motor box 161 houses electrical and mechanical components which control the operation of the cleaner 100, e.g., drive the wheel assemblies 130, the roller assemblies 140, the impeller unit 162; detect an orientation of the robotic pool cleaner, monitor a pump loading of the pump motor, and detect when the robotic cleaner approaches and/or breaches the waterline in a pool; and the like. While the motor box 161 has been illustrated as being centrally positioned within the housing assembly 110 (along the longitudinal axis), those skilled in the art will recognize that in example embodiments of the present disclosure, the motor box 161 can be offset towards a front or rear of the robotic cleaner 100.

In example embodiments, the impeller unit 162 includes an impeller 162C, an apertured support 162A (which defines intake openings below the impeller 162C), and a duct 162B (which houses the impeller 162C and forms a lower portion of the filtration vent shaft). The duct 162B is generally configured and dimensioned to correspond with a lower portion of the vent channel 152 of the filter assembly 150. The duct 162B, vent channel 152, and vent aperture 122 (shown in FIGS. 2-3) may cooperate to define the filtration vent shaft which, in some embodiments, extends up along the ventilation axis Av and out through the lid assembly 120. The impeller unit 162 acts as a pump for the cleaner 100, drawing water through the filter assembly 150 and pushing filtered water out through the filtration vent shaft. An example filtration flow path for the cleaner 100 is designated by directional arrows depicted in FIG. 3.

The motor drive assembly 160 is typically secured, e.g., by screws, bolts, etc., relative to the inner bottom surface of the housing assembly 110. The motor drive assembly 160 is configured and dimensioned so as to not obstruct the filtration intake apertures 113 of the housing assembly 110. Furthermore, the motor drive assembly 160 is configured and dimensioned such that cavity space remains in the housing assembly 110 for the filter assembly 150.

A function of the pump motor is to power the impeller 162C and draw water through the filter assembly 150 for filtration. More particularly, unfiltered water and debris are drawn via the intake apertures 113 of the housing assembly 110 through the intake channels 153 of the filter assembly 150 and into the one or more bucket-shaped intake flow regions 157, wherein the debris and other particles are trapped. The water then filters into the one or more vent flow regions 158. With reference to FIG. 3, the flow path between the intake flow regions 157 and the vent flow regions 158 can be through the side filter panels 154 and/or through the top filter panels 155. The filtered water from the vent flow regions 158 is drawn through the intake openings defined by the aperture support 162A of the impeller 162C and discharged via the filtration vent shaft.

Figure 4:
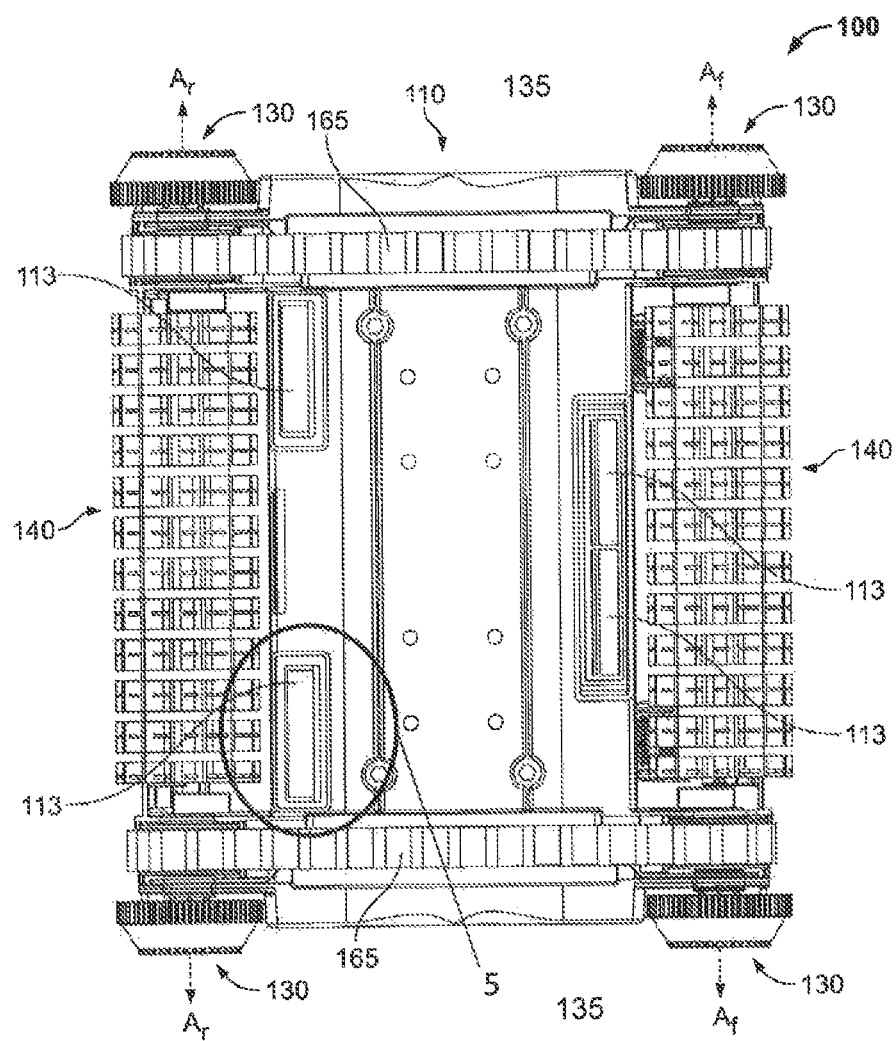
FIG. 4 depicts a bottom plan view of an example embodiment of the robotic pool cleaner of FIG. 1.

FIG. 4 depicts a bottom plan view of an example embodiment of the robotic pool cleaner 100 of FIG. 1 showing an arrangement of the intake apertures 113, wheel assemblies 130, the rollers 140, and a drive belt 165 that can be driven to drive the wheel assemblies 130 and/or rollers 140. FIG. 5A shows a more detailed view of one or the intake apertures 113 illustrating an exemplary arrangement of the optical sensor 105 with respect to the intake aperture. As shown in FIG. 5A, the optical sensor 105 can include one or more light emitters 410 disposed along a first edge 402 of the intake aperture 113 and one or more light detectors 420 disposed along a second edge 404 of the intake aperture such that the light emitters 410 and the light detectors 420 are generally opposingly spaced from each other to form a transmissive sensor. For example, the optical sensor 105 can include an array 412 of light emitters 410 and an array 422 of light detectors 420. In operation, the light emitters 420 can emit light 430 across the intake aperture 113 such that the light is received by the light detectors 420. Debris 450 passing through the intake aperture 113 can block or otherwise prevent some of the light 430 from reaching the light detectors 420 such that the light measured by the light detectors can decrease based on the properties (e.g., size, composition, etc.) of the debris 450. In some embodiments, the array of light emitters 410 can form a "light curtain" that covers the opening formed by the intake aperture 113.

In exemplary embodiments, the light emitters 410 can be implemented as, for example, light emitting diodes, and/or can be configured to output light at one or more wavelengths, and the light detectors can be implemented, for example, as photodiodes that have a sensitivity to the one or more wavelengths of light that are output by the light emitters. As one example, the light emitters can be configured to output infrared light. Using infrared light in the application of a pool cleaner advantageously limits the distance the infrared light travels due to the absorption of infrared light by water. When the light detection has a sensitivity in the infrared range, the likelihood that stray infrared radiation will impinge upon the light detector is greatly reduced. As another example, the light emitters can be configured to output visible light and/or ultraviolet light. In some embodiments the light emitters can output light of different wavelength at different times and a relationship of the responses of light detectors to the different wavelength of light can be used to enhance the ability of the pool cleaner to detect whether debris is flowing through the intake pathway. In some embodiments, the light detectors can include a lens with light filters to narrow the range of wavelengths the light detector detects.

Figure 5B:
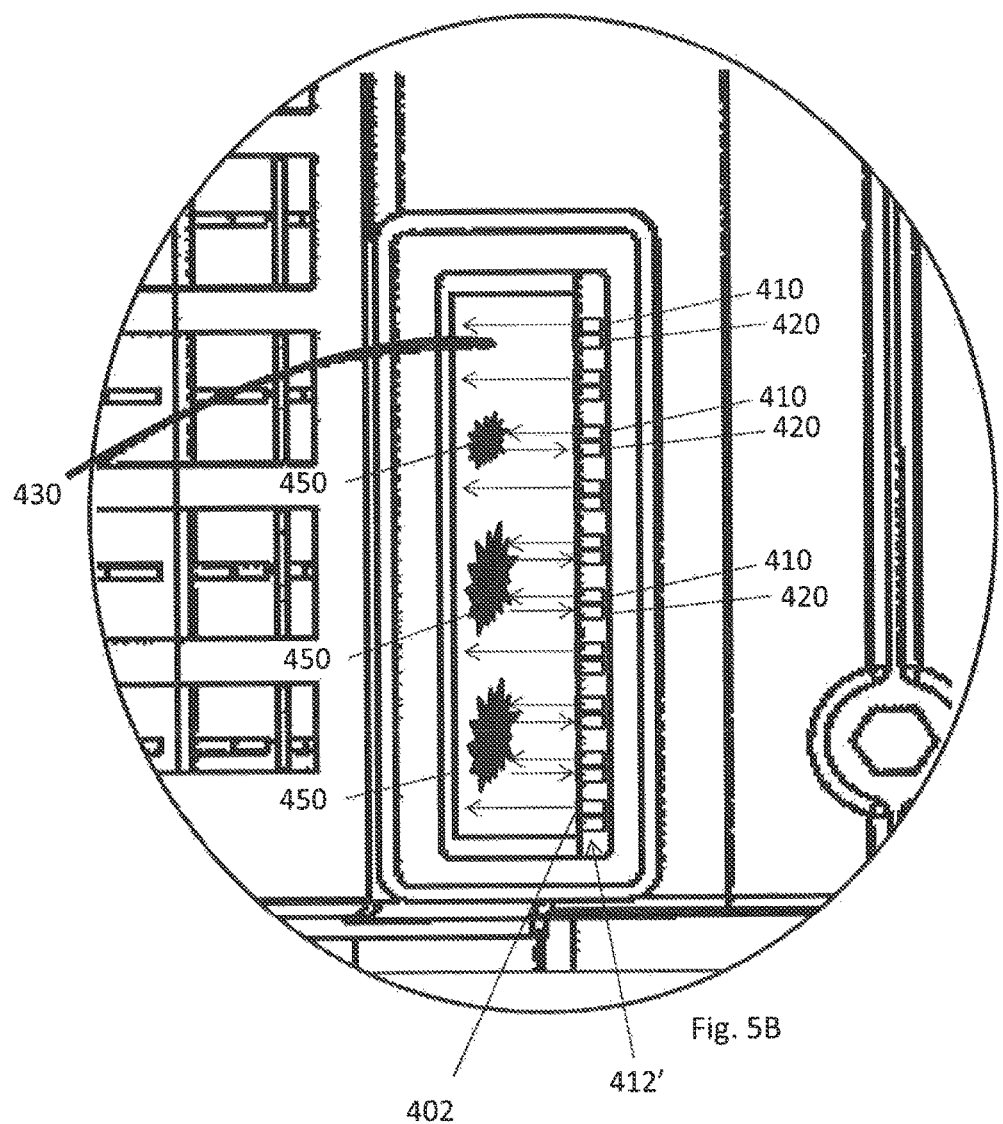
FIG. 5B shows another exemplary arrangement of the optical sensor with respect to the intake aperture.

FIG. 5B shows another exemplary arrangement of another embodiment of the optical sensor 105 with respect to the intake apertures 113. As shown in FIG. 5B, the optical sensor 105 can include one or more of the light emitters 410 disposed along a first edge 402 of the intake aperture 113 and one or more of the light detectors 420 disposed along the first edge 402 of the intake aperture such that the light emitters 410 and the light detectors 420 are generally positioned adjacent to each other (e.g., are collocated) to form a reflective sensor. For example, the optical sensor 105 can include an array 412' of light emitters 410 and light detectors 420. In operation, the light emitters 420 can emit light 430 into the intake aperture 113, when the light 430 impinges upon debris 450 passing through the intake aperture 113, at least a portion of the light can be reflected (e.g., reflected light 435) back to towards the first edge 402 such that the light is received by the light detectors 420, while the light 430 that does not impinge upon debris 450 is not reflected.

Figure 6:
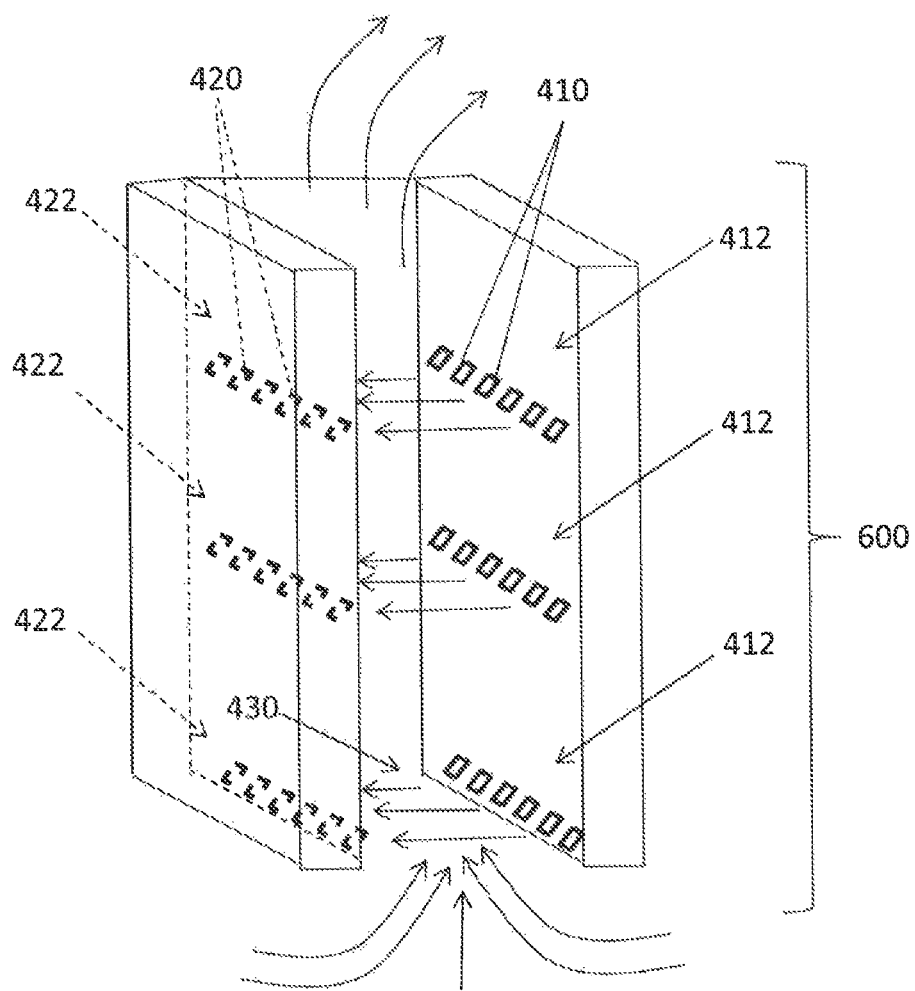
FIG. 6 schematically depicts a cross-sectional view of an intake pathway of an example embodiment of the robotic pool cleaner of FIG. 1.

FIG. 6 schematically depicts a cross-sectional view of an intake pathway 600 of an example embodiment of the robotic pool cleaner of FIG. 1. As shown in FIG. 6, the intake pathway can include and extend from the intake aperture 113. One or more optical sensors 105 can be disposed along the intake pathway 600, where each of the optical sensors 105 include the array 412 of the light emitters 410 and the array 422 of the light detectors 420. The light emitters 410 can emit light 430 into the intake pathway 600 and the light detectors 422 can detect the light 430 emitted into the intake pathway 600, where the amount of debris and/or air flowing through the intake pathway with water can affect the amount of light that the light detectors 420 detect. While FIG. 6 is illustrative of a transmissive-type optical sensor, the optical sensors disposed along the intake pathway can be formed as reflective-type optical sensors or a combination of transmissive-type and reflective-type optical sensors in accordance with exemplary embodiments of the present disclosure.

Figure 7:
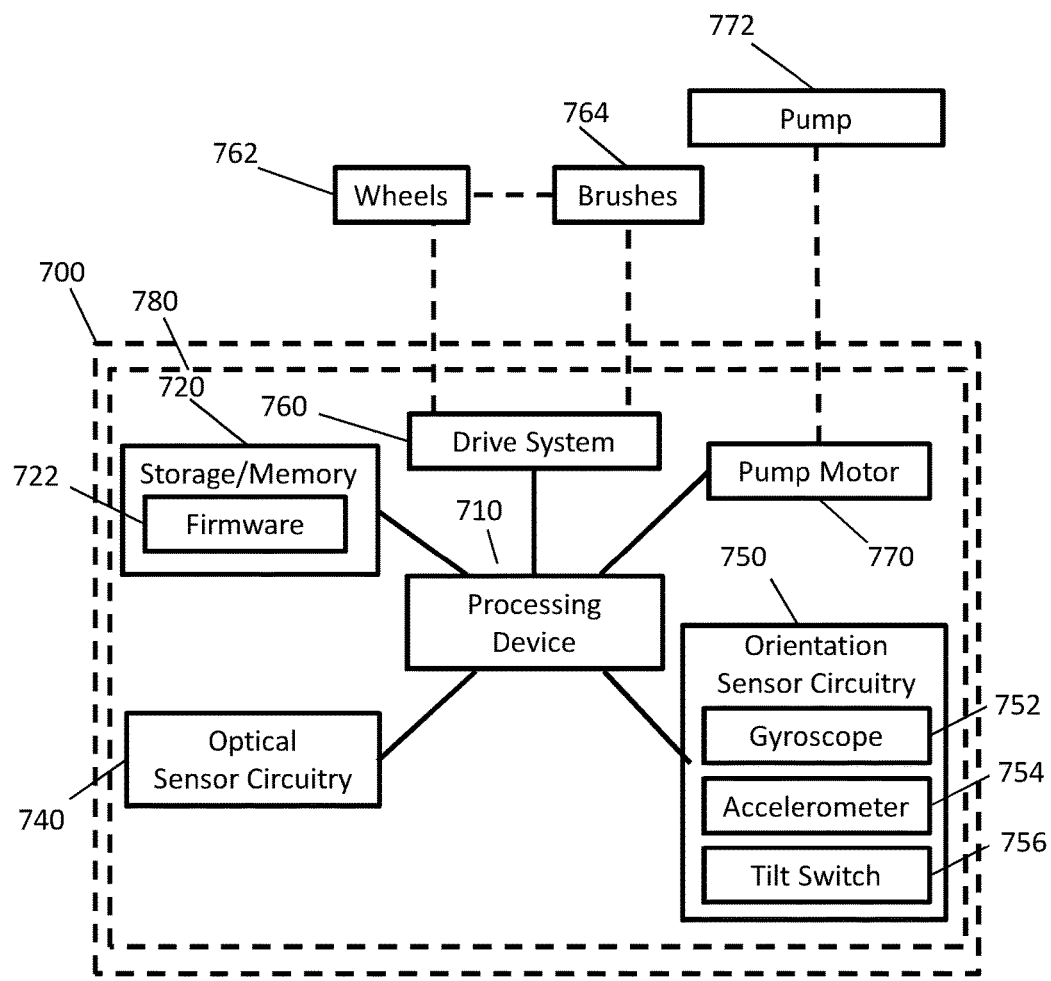
FIG. 7 is a block diagram of an example embodiment of components that form a robotic pool cleaner control system.

FIG. 7 is a block diagram of an example embodiment of components that form a robotic pool cleaner control system 700. As shown in FIG. 7, the control system 700 can include a processing device 710; a non-transitory computer-readable medium 720 (e.g., computer storage and/or memory); optical sensor circuitry 740; orientation sensor circuitry 750; a drive system 760 to drive one or more wheels 762 (or wheel axles) and/or brushes/rollers 764 (or brush/roller axles) of the robotic pool cleaner 100; and a pump motor 770 operatively coupled to a pump 772 for drawing water and debris through the robotic pool cleaner 700 to clean one or more surfaces of a pool. In some embodiments, the processing device and medium can be packaged together in a microcontroller. In some embodiments, the pump motor 770 and/or pump 772 can form at least a portion of the drive system 760.

At least some of the components of the control system 700 can be disposed within a motor box and/or in other sealed, water-tight containers to isolate the components from direct contact with the environment external to the container (e.g., water and/or air). For example, in example embodiments, the processing device 710, medium 720, portions of the optical sensor circuitry 740; orientation sensor circuitry 750, at least a portion of the drive system 760, and the pump motor 770 can be disposed within a sealed, water-tight container 780 (e.g., a motor box). While the processing device 710, medium 720, orientation sensor circuitry 750, at least a portion of the drive system 760, and the pump motor 770 are illustrated as being disposed within a single container, those skilled in the art will recognize that components of the control system 700 can be in multiple sealed, water-tight containers, and that components in different containers can be operatively connected via water-proof or water-resistant insulated electrical conductors that extend between the containers.

In example embodiments of the present disclosure, the processing device 710 of the control system 700 can be programmed to execute firmware 722 stored in the medium 720 to determine whether at least of the portion of the robotic pool cleaner is out-of-water and/or whether the robotic pool cleaner is intaking (e.g., picking up) a detectable level of debris in response to, at least in part, an output of the optical sensor circuitry 740, which is provided as an input to the processing device 710. For example, a sensor signal representing or corresponding to a composition of material flowing through the intake apertures can be output from the optical sensor circuitry 740 to the processing device 710 such that the robotic pool cleaner 700, via the processing device 710 executing the firmware 722, can process the sensor signal to determine whether the robotic pool cleaner 700 is, at least partially, out of the water and/or whether a detectable level of debris is flowing through the intake apertures 113 of the robotic pool cleaner 700.

The orientation sensor circuitry 750 can include a gyroscope 752, an accelerometer 754, and/or a mechanical tilt switch 756, and can output sensor signals to the processing device 710 corresponding to an orientation, acceleration, and/or position of the robotic pool cleaner relative to, for example, the earth's gravitational force. The orientation sensor circuitry 750 can be used by the control system 700 to determine whether an orientation of the robotic pool cleaner is horizontal, inclined, declined, and/or vertical, which can provide the processing device with information about whether the robotic pool cleaner is moving along a bottom of the pool or up a side wall of the pool.

The processing device 710 can also execute the firmware 722 to monitor an operation of the pump motor 770 to determine, for example a loading of the pump based on an electrical current drawn by the pump and/or a power dissipated by the pump. The loading of the pump can be used by the processing device 710 to determine whether the pump is pumping water, air, debris, and/or a combination of water and air. As one example, when the robotic pool cleaner is positioned on the bottom of a pool pumping water, the loading of the pump motor will have a different signature than when the robotic pool cleaner is positioned at or above the waterline where it may be pumping a combination of water and air or only (e.g., predominantly) air. In some embodiments, this information can be used in conjunction with the sensor signals output by the optical sensor circuitry to validate and/or provided redundancy to the debris detection performed using the optical sensor circuitry.

Based on a determination that at least of the portion of the robotic pool cleaner is above the waterline of the pool in response to processing the sensor signals from the optical sensor circuitry (either independently or used in conjunction with a measurement of the pump loading and/or a detection of the orientation of the pool cleaner), the processing device 710 can be programmed to perform one or more operations or actions. As one non-limiting example, the processing device 710 can control an operation of the drive system to cause the robotic pool cleaner to reverse its direction of travel; cease driving one or more wheels (or wheel axles), brushes/rollers (or brush/roller axles), and/or impellers of the robotic pool cleaner; drive one or more wheels (or wheel axles), brushes/rollers (or brush/roller axles), and/or impellers of the robotic pool cleaner so that the robotic pool cleaner oscillates about and along the waterline of the pool; reduce or cease driving pumps of the robotic pool cleaner to prevent damage to the pump motor due to an excessive amount of air being drawn through the pump; and/or can control an operation of the robotic pool cleaner to implement any suitable operations or actions.

Based on a determination that the robotic pool cleaner is picking up a detectable level of debris in response to processing the sensor signals from the optical sensor circuitry (either independently or used in conjunction with a measurement of the pump loading), the processing device 710 can be programmed to perform one or more operations or actions. As one non-limiting example, the processing device 710 can control an operation of the drive system to cease or slow down driving one or more wheels 132 (or wheel axles) of the robotic pool cleaner 100 to allow the robotic pool cleaner to remain in one location to continue to intake the debris until the output of the optical sensor(s) 105 are indicative that the pool cleaner has picked up a substantial amount of the debris (e.g., the amount of debris flowing through the intake apertures 113 is less than a detectable level of debris); drive one or more wheels 132 (or wheel axles) to circle about the location of the pool where the debris is detected; increase the rate and/or torque that the driving pumps of the robotic pool cleaner 100 to increase a flow through the intake apertures 113; and/or can control an operation of the robotic pool cleaner 100 to implement any suitable operations or actions. For example, in some embodiments, the pool cleaner can extend a cleaning time of the current cleaning cycle; can extend a cleaning time of future cleaning cycles; can increase the frequency with which it operates to clean the pool; learn where in the pool there is debris by mapping the pool using machine vision (e.g., by including cameras on the pool cleaner and using a machine vision function to map structures of the pool and then associate areas where debris accumulates to the map structure).

Based on a determination that the robotic pool cleaner is not picking up a detectable level of debris in response to processing the sensor signals from the optical sensor circuitry (either independently or used in conjunction with a measurement of the pump loading), the processing device 710 can be programmed to perform one or more operations or actions. As one non-limiting example, the processing device 710 can control an operation of the drive system to increase a drive speed and/or torque of the one or more wheels 132 (or wheel axles) of the robotic pool cleaner 100 to allow the robotic pool cleaner to move to another location along the immersed surface of the pool until the output of the optical sensor(s) 105 are indicative that the pool cleaner is picking up a detectable level of debris; and/or change a direction of travel of the robotic pool cleaner 100.

In exemplary embodiments, the processing device 710 can be programmed to execute the firmware 722 to determine what type of debris the pool cleaner is picking up. For example, the output of the optical sensors 105 can have different signatures based on the type of debris that is flowing through the intake pathways, and the processing device can classify the debris being picked up by comparing the output of the optical sensor to the different signatures to identify the signature that most closely matches the type of debris. In some embodiments, the signatures can be generated based on an amplitude of the output from the optical sensor, a variability of the output from the optical sensor, a time varying characteristic of the output of the optical sensor over multiple measurement cycles. In some embodiments, the processing device 710 can be programmed to execute the firmware 722 to perform time domain and/or frequency domain processing of the outputs from optical sensors 105 (e.g., after the outputs pass through the sensor circuitry 740). As non-limiting examples, the outputs of the optical sensors 105 can be processed via a Fast Fourier Transform (FFT) algorithm, a Wavelet transform, one or more high and/or low pass filters, and/or any other suitable signal processing operations or algorithms. As non-limiting examples, the signature corresponding to leaves passing through the intake channel can include a high density of output variability at low frequencies and the signature corresponding to sand passing through the intake pathway can have a high density of output variability at high frequencies.

In exemplary embodiments, the processing device 710 can used images captured by image capturing devices 735 to map the pool based on the content of the images (e.g., using machine vision). Using this approach, the images can be used by the pool cleaner to identify where the pool cleaner is in the pool such that when the pool cleaner is disposed at a certain location in the pool, the processing device 710 can control the pool cleaner to perform one or more operations in response to recognizing that the pool cleaner is at the certain position and/or based on a history of the type of debris that has historically been detected at the location. As one example, based on a cleaning history and images captured during previous cleaning of the pool that are stored in the medium 720, the processing device 710 can associate a location in the pool as determined by the images as typically having more debris than other locations in the pool and/or as typically having a certain type of debris based on the optical detection of debris performed by the pool cleaner. When the pool cleaner is cleaning the pool and arrives at the location, e.g., based on a comparison images previously captured by the pool cleaner to images that are contemporaneously captured by the image capturing device(s) 735, the processing device 710 can control the pool cleaner to deviate from a normal cleaning routine to improve the cleaning of the location (e.g., alter the speed at which the robotic cleaner travels, alter the movement of the pool cleaner 100, and the like).

Figure 8:
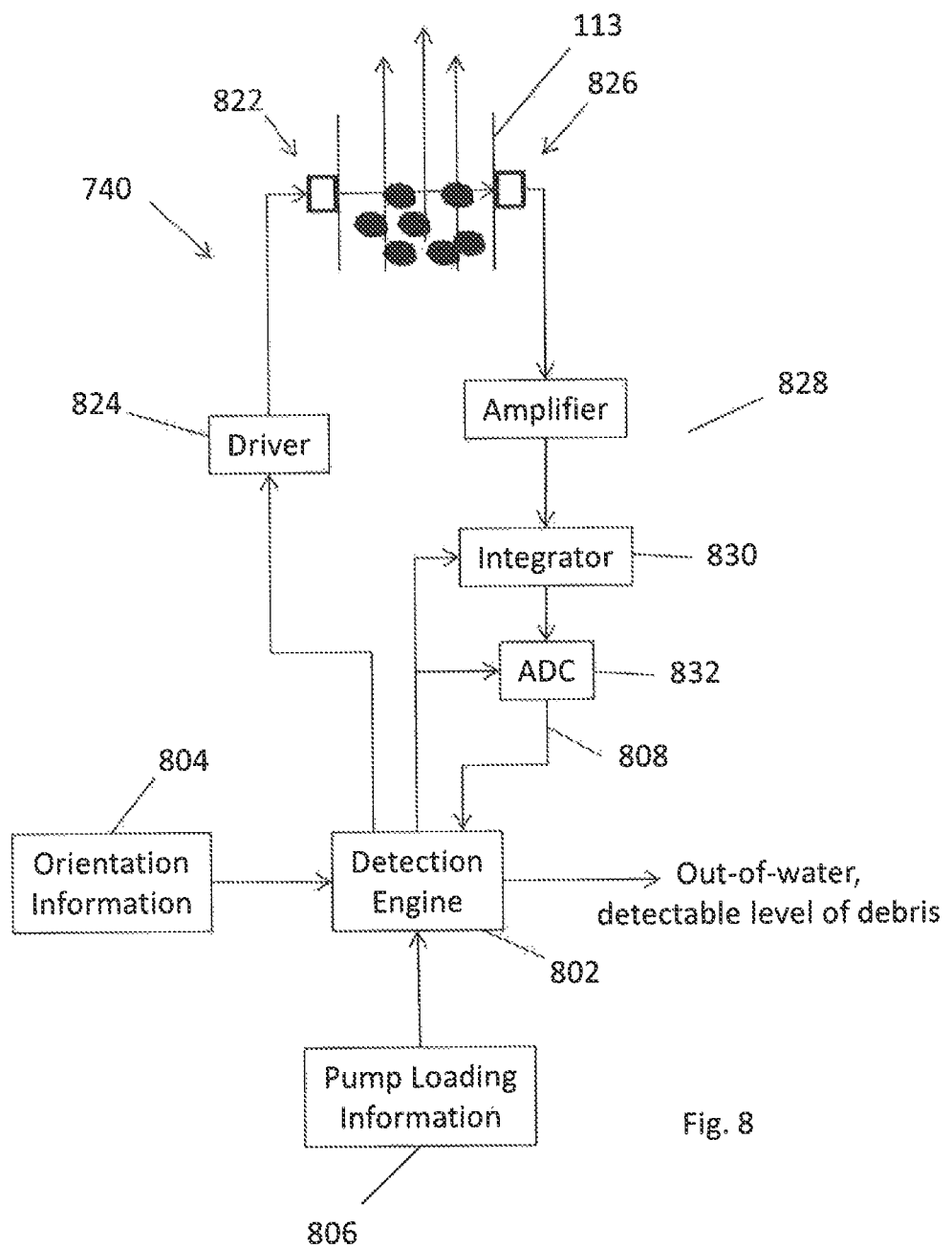
FIGS. 8 and 9 are functional block diagrams illustrating an operation of a robotic pool cleaner control system in accordance with example embodiments of the present disclosure.
Figure 9:
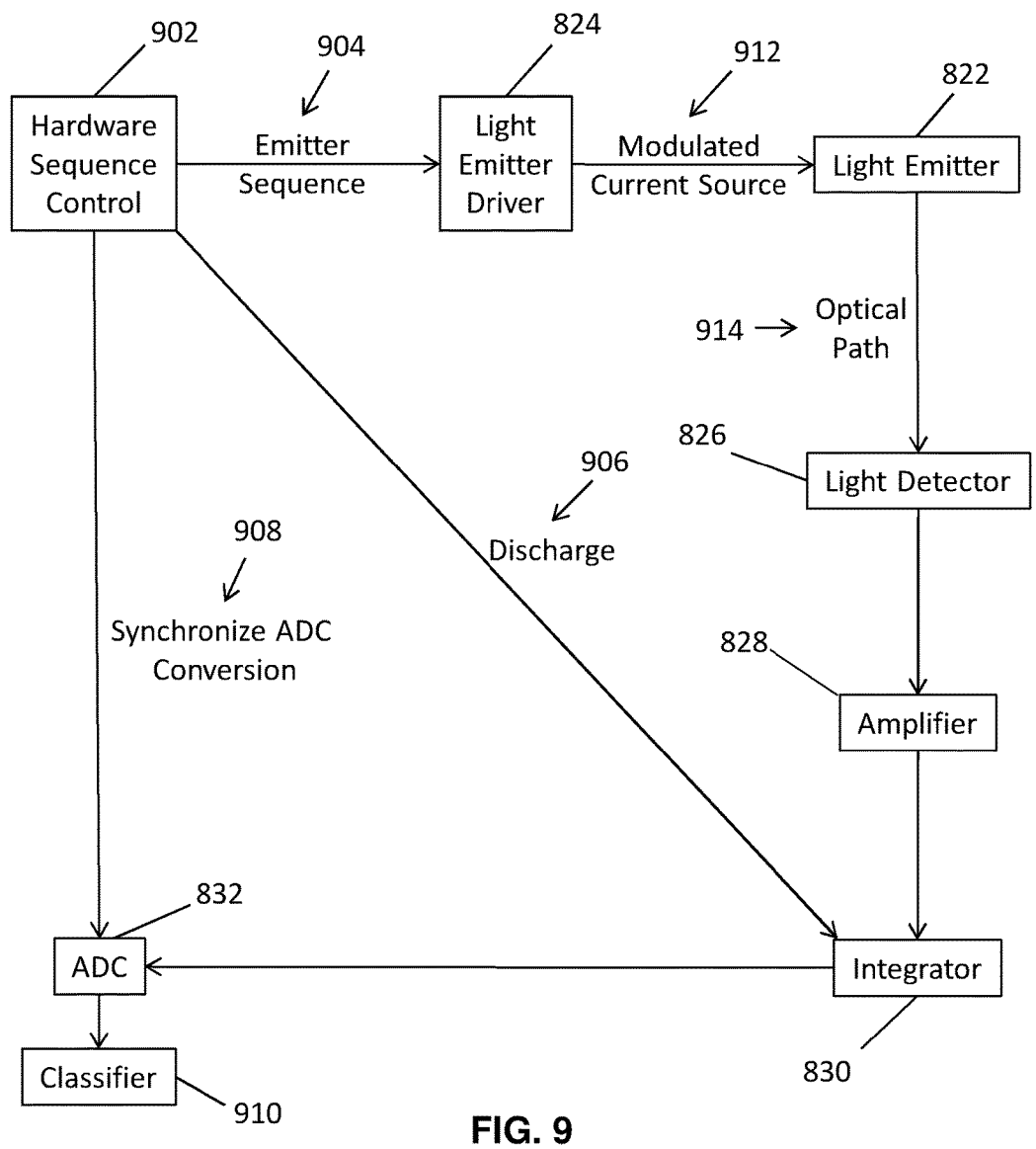

FIGS. 8 and 9 are a functional block diagrams illustrating an operation of a robotic pool cleaner in accordance with example embodiments of the present disclosure. As shown in FIG. 8, a detection engine 802, which can be implemented by the processing device 710 upon execution of the firmware 722 (FIG. 7), can receive information input from one or more components of the robotic pool cleaner. For example, the orientation sensor circuitry can provide orientation information 804 as an input to the detection engine 802 and pump loading information 806 can be input to the detection engine 802 for measurement associated with an operation of the pump motor. The detection engine 802 can also receive optical sensor information 808 from optical sensor circuitry 740, which in the present embodiment, can include a light emitter driver 824, one or more light emitters 822, one or more light detectors 826, an amplifier 828, an integrator 830, and an analog-to-digital converter 832. While the optical sensor circuitry 740 has been illustrated as including the light emitter driver 824, the amplifier 828, the integrator 830, and the analog-to-digital converter 832, those skilled in the art will recognize that the light emitter driver 824, the amplifier 828, the integrator 830 and the analog-to-digital converter 832 can be implemented and/or included in the processing device 710 (FIG. 7) (or packaged in a microcontroller with the processing device) such that the stand alone components of the optical sensor circuitry 740 can include the one or more light emitters 822 and the one or more light detectors 826.

The detection engine 802 can process the information 804, 806, and 808 received from the components of the robotic pool cleaner, and can process the information 804, 806, and 808 to determine whether at least a portion of the robotic pool cleaner is above waterline of a pool and/or can determine whether a detectable level of debris is flowing through the intake apertures of the robotic pool cleaner. As one example, the detection engine 802 can determine whether the orientation information 804 and/or the pump loading information 806 being received is consistent with an operation of the robotic pool cleaner disposed on a bottom surface of a pool or whether the orientation information 804 and/or the pump loading information 806 is consistent with an operation of the robotic pool cleaner climbing a side wall of a pool. As another example, the detection engine 802 can determine whether the optical sensor information 808 and/or the pump loading information is consistent with a detectable level of debris flowing through the intake apertures of the robotic pool cleaner. The detectable level of debris can be a threshold level of debris that can be detected based on the sensitivity and/or resolution of, for example, the light emitter(s) 822, the light detector(s) 826, the amplifier 828, the integrator 830, and/or the analog-to-digital converter 832.

Referring to FIGS. 8 and 9, the detection engine 802 can include a hardware control sequence 902 to control a rate at which the optical sensor circuit is operated. For example, the detector engine 802 can coordinate an operation of one or more hardware components of pool cleaner. Based on the hardware control sequence 902, the detection engine 802 can be configured to output an emitter sequence 904 to the light emitter driver 824 to control an output of the driver 824 and the one or more light emitters 822; can output a discharge control 906 to discharge or reset the integrator 830 between measurements of the output of the one or more light detectors 826; and/or can output a synchronization signal 908 to the analog-to-digital converter 832 to control a sample time of the analog-to-digital control. The detection engine 802 can also implement a classifier 910 which operates to classify the integrated output of the light detector to determine whether water, a detectable level of air, and/or a detectable level of debris is flowing through the intake pathways of the pool cleaner. The hardware control sequence 902 of the detector engine 802 can be configured to control the optical sensor circuitry to alternate between measuring an ambient amount of light detected by the one or more light detectors 826 when the one or more light emitters 822 are not outputting light and measuring a cumulative effect of the ambient light and light output by the one or more light emitters 822. A difference between these two measurements can be taken to factor out the ambient light from process of determining whether water, air, and/or debris is flowing through the intake pathways of the pool cleaner. That is, the detection engine 802 can implement a common-mode measurement process (e.g., where ambient light is the common mode) to substantially reduce the impact of ambient light on the ability of the classifier 910 to distinguish between water, air, and/or debris.

In an exemplary operation, the detection engine 802 implements the hardware control sequence 902 to drive the driver 824 according to the emitter sequence 904. In response to the emitter sequence 904, the driver 824 outputs a modulated current source 912 to the one or more light emitters 822 to control an output of light from the one or more light emitters 822. The light output by the one or more light emitters 822 can be received by the one or more light detectors 826, creating an optical path 914 between the one or more light emitters 822 and the one or more light detectors 826 (unless the light is blocked entirely by materials passing through the intake pathways). The one or more light detectors 826 convert the intensity of the incident light into an electric current. The electrical current corresponding to the intensity of light incident upon the one or more light detectors 826 is provided as an input to the amplifier 828, which amplifies the electrical current. The electrical current is fed, as an input, to the integrator, which integrates the electrical current for a specified period of time as determined by the discharge or reset signal issued based on the hardware control sequence 902. The output of the integrator 830 can be a total electrical current received by the integrator 830 over the specified period of time. The output of the integrator 830 is fed to the analog-to-digital converter which converts the total electrical current into a quantized value having a specified bit resolution, which is output to the classifier 910 of the detector engine 802. The classifier 910 processes the quantified value output by the analog-to-digital converter 832 to determine whether a detectable level air and/or debris is flowing through the intake pathways, and/or can classify the types of debris following through the intake pathways.

In some embodiments, the classifier 910 can implement a machine learning algorithm to classify debris passing through the intake pathway based on the signatures of the response of the optical sensor(s) to the debris. As a non-limiting example, the classifier 910 can implement one or more machine learning algorithms, such as, a naïve Bayes classifier, decision tree(s), support vector(s), logistical regression, and/or any other suitable machine learning algorithms for classifying classify debris passing through the intake pathway. For example, an output signal of the optical sensor can be sampled as described herein and a windowing function can be applied to the output signal. A wavelet transform can be applied to the window to generate wavelets and associated coefficients, which can be used to train a filter to classify the debris based on the wavelets.

Figure 10:
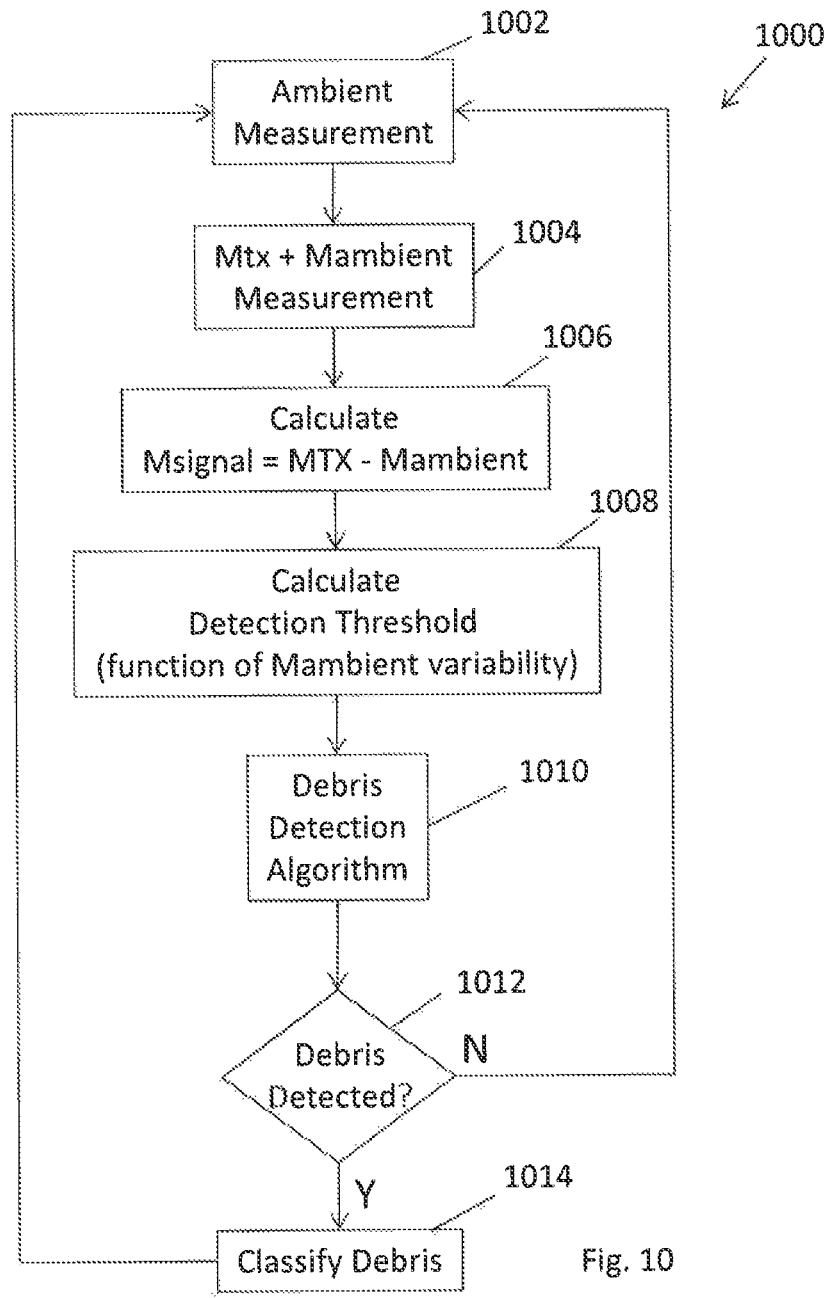
FIG. 10 is a flowchart illustrating an exemplary detection and classification process in accordance with exemplary embodiments of the present disclosure.

FIG. 10 is a flowchart illustrating an exemplary detection and classification process 1000 that can be implemented by exemplary embodiments of the pool cleaner in accordance with the present disclosure. At step 1002, the pool cleaner can measure an intensity of ambient light that is incident upon the light detectors in the intake pathways, and at step 1004, the pool cleaner can measure the intensity of the ambient light and the light emitted from the light emitters incident upon the light detectors. At step 1006, the pool cleaner can determine a measurement signal value by subtracting the measurement of step 1002 from the measurement of step 1004. At steps 1008 and 1010, the pool cleaner can determine whether a detectable level of debris is flowing through the intake pathways of the pool cleaner. If a detectable level of debris is not detected (step 1012), the process repeats from step 1002. If a detectable level of debris is detected (step 1012), the pool cleaner, at step 1014, classifies the debris based on a signature corresponding to the intensity of the light incident upon the light detectors after factoring out the impact of the ambient light, and the process repeats from step 1002.

Figure 11:
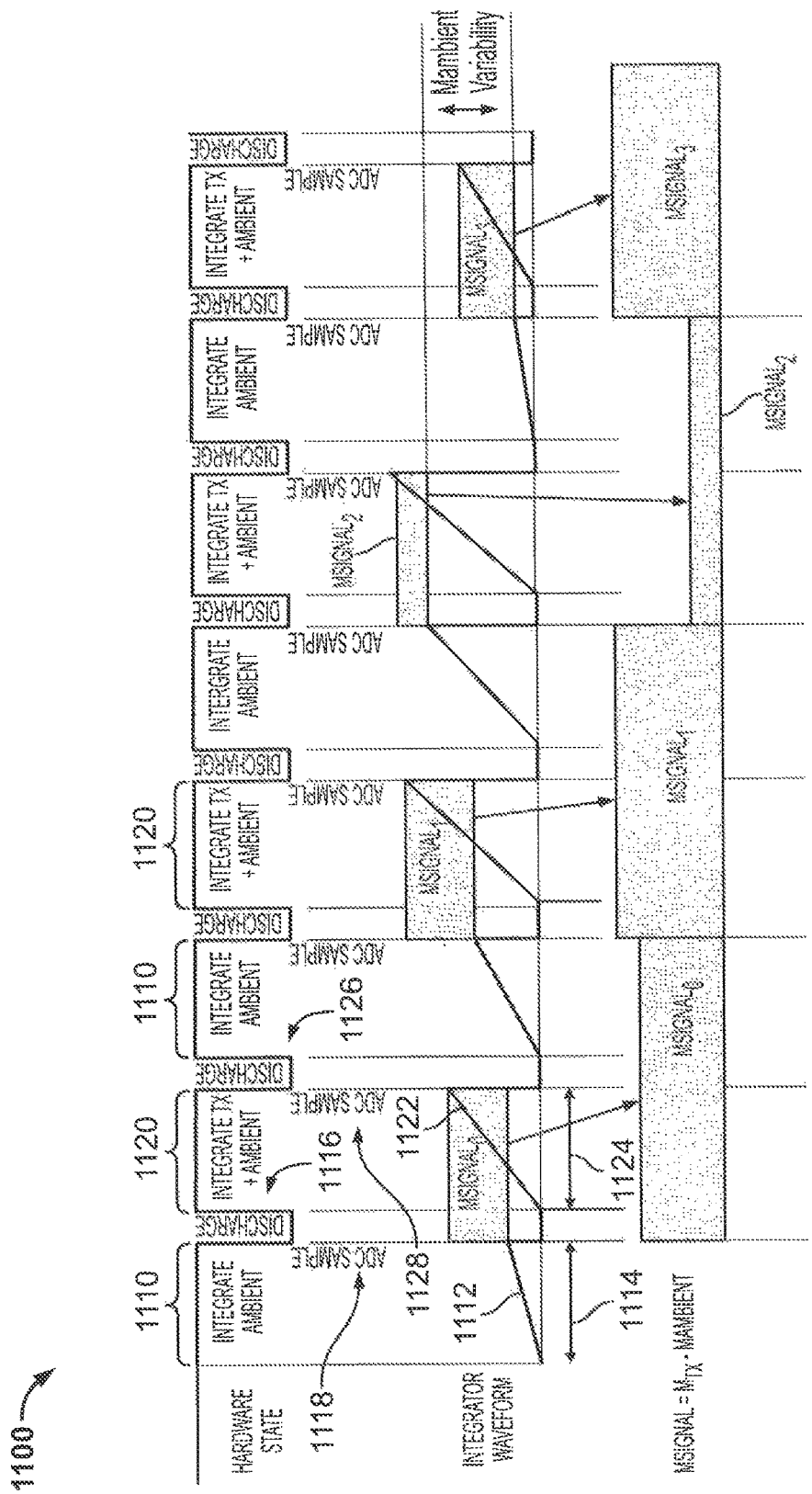
FIG. 11 is a graphical representation of a measurement process that can be implemented in accordance with exemplary embodiments of the present disclosure.

FIG. 11 is a graphical representation of a measurement process 1100 that can be implemented exemplary embodiments of the pool cleaner in accordance the present disclosure. As shown in FIG. 11, the measurement process can alternate between measurements 1110 of the ambient light incident upon the light detectors (e.g., an ambient measurement cycle) and measurement 1120 of the light output from the light emitters and the ambient light (e.g., a debris measurement cycle). During each measurement cycle, the pool cleaner can integrate an electrical current corresponding to the light incident upon the light detectors for a specified time period, and can sample the integrated electrical current using an analog-to-digital converter at a specified sample time during the measurement cycle. As an example, during the measurements 1110, the light emitters are de-energized, and the integrator integrates the electrical current 1112 corresponding to the output of the light detectors for a specified time period 1114 until the integrator receives a discharge or reset signal 1116 from a processing device of the pool cleaner. The analog-to-digital converter can be configured to sample the integrated output of the integrator in response to receipt of a synchronization signal 1118 from the processing device of the pool cleaner, which can occur prior to or simultaneously with the discharge or reset signal 1116.

During the measurements 1120, the light emitters are energized according to a modulated current, and the integrator integrates the electrical current 1122 corresponding to the output of the light detectors for a specified time period 1124 until the integrator receives a discharge or reset signal 1126 from a processing device of the pool cleaner. The analog-to-digital converter can be configured to sample the integrated output of the integrator in response to receipt of a synchronization signal 1128 from the processing device of the pool cleaner, which can occur prior to or simultaneously with the discharge or reset signal 1126. After a pair of measurements 1110 and 1120 are taken, the processing device of the pool cleaner can determine a differential-mode signal associated with the intensity of the light output by the light emitters that is incident upon the light detectors by factoring out the contributions of the ambient light to the measurements 1110 and 1120.

Figure 12:
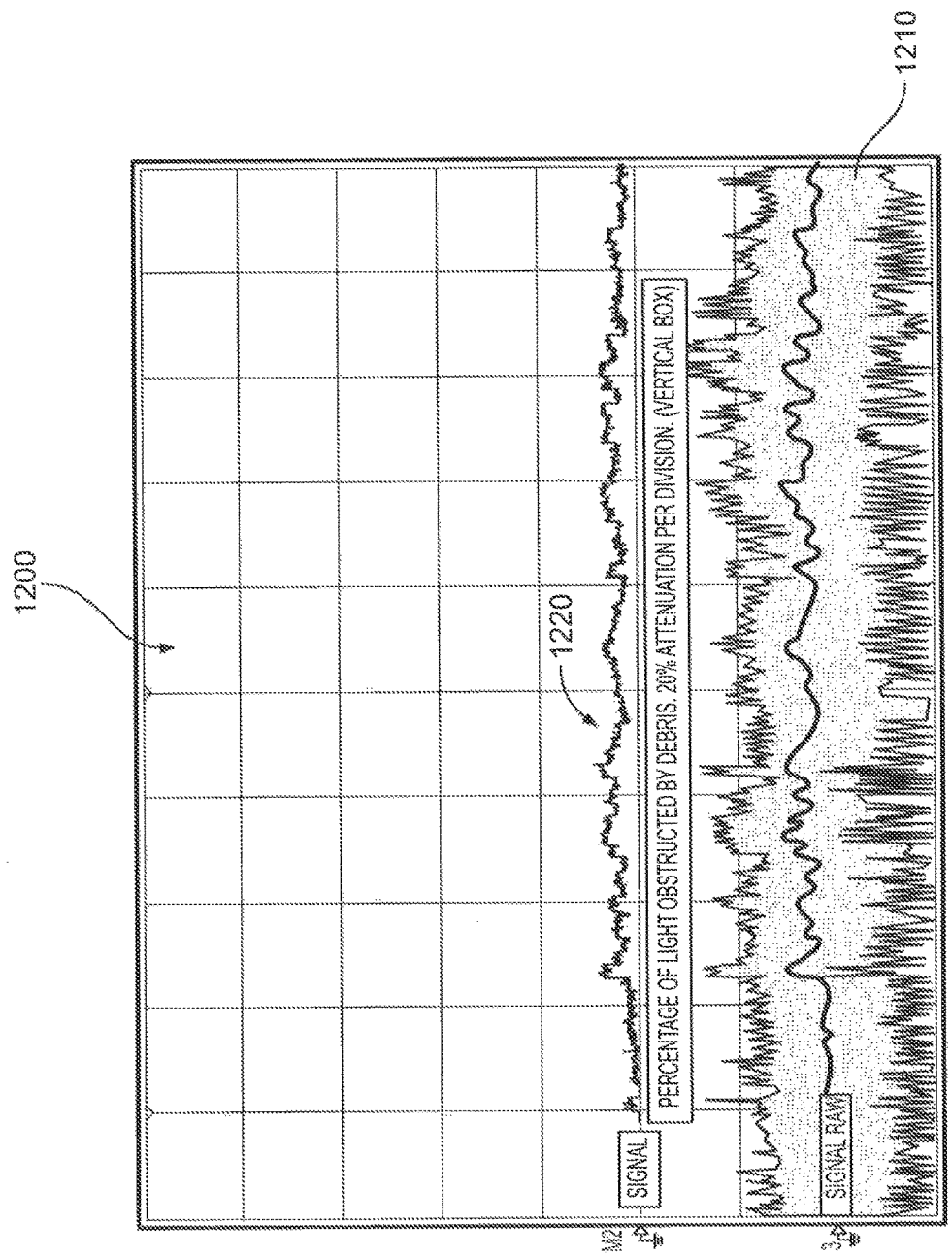
FIG. 12 shows data captured by an oscilloscope illustrating experimental results corresponding to a response of an embodiment of an optical sensor disposed within an intake pathway to cloudy water and sand passing through the intake pathway.

FIG. 12 shows data 1200 captured by an oscilloscope illustrating experimental results corresponding to a response of an embodiment of an optical sensor disposed within an intake pathway to cloudy water and sand passing through the intake pathway. The scale of the oscilloscope is set to five hundred millivolts (500 mV) per division in the direction of y-axis and is set to two hundred milliseconds (200 ms) in the direction of the x-axis. Curve 1210 represents an output of the optical sensor as the optical sensor switches between the ambient measurement cycle and the debris measurement cycle. Curve 1220 represents difference between the output of the optical sensor switches from the ambient measurement cycle and the debris measurement cycle. The separation between the curves 1210 and 1220 is an offset applied by the oscilloscope.

Figure 13:
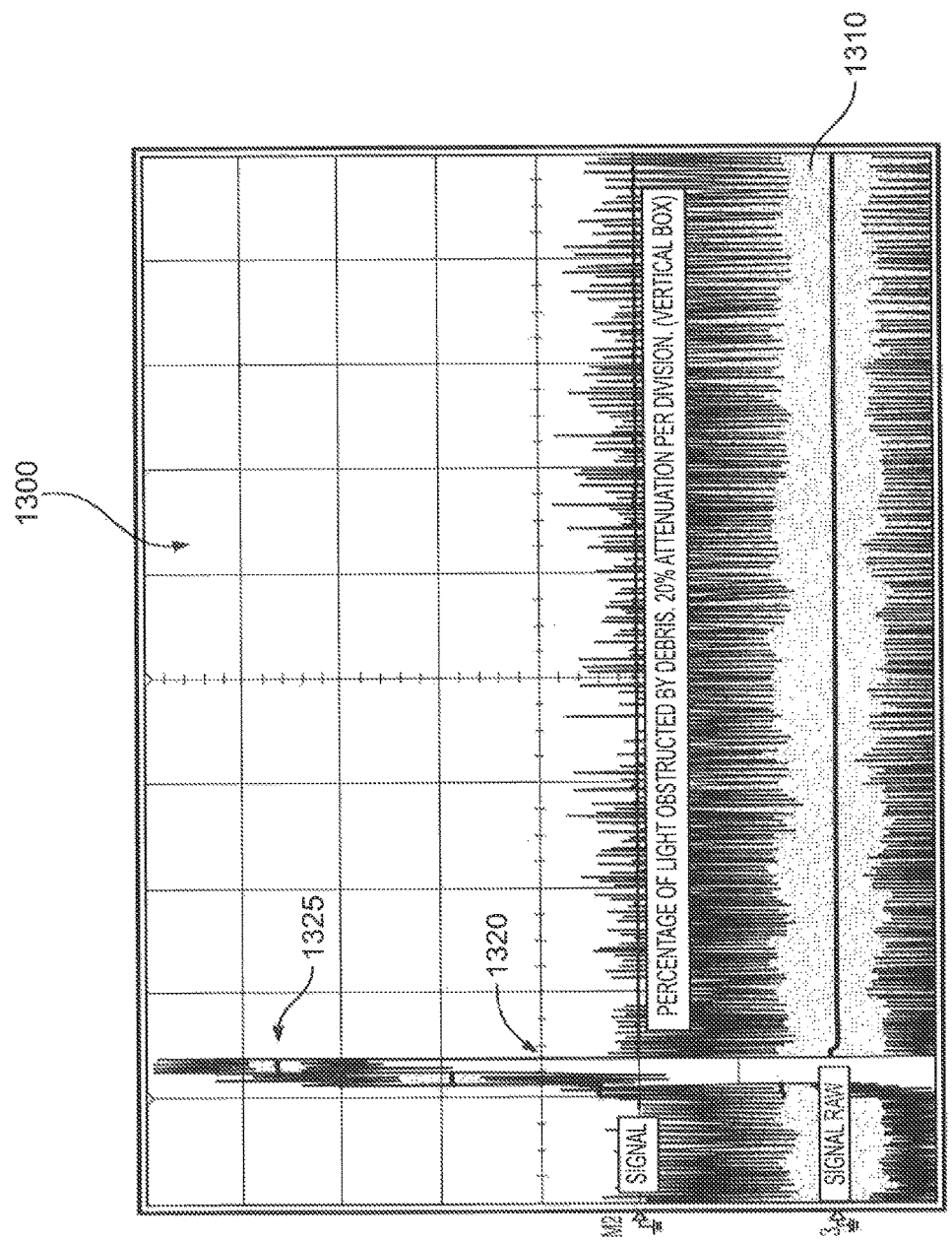
FIG. 13 shows data captured by an oscilloscope illustrating experimental results corresponding to a response of an embodiment of an optical sensor disposed within an intake pathway to cloudy water and leaves passing through the intake pathway.

FIG. 13 shows data 1300 captured by an oscilloscope illustrating experimental results corresponding to a response of an embodiment of an optical sensor disposed within an intake pathway to cloudy water and leaves passing through the intake pathway. The scale of the oscilloscope is set to five hundred millivolts (500 mV) per division in the direction of y-axis and is set to two hundred milliseconds (200 ms) in the direction of the x-axis. Curve 1310 represents an output of the optical sensor as the optical sensor switches between the ambient measurement cycle and the debris measurement cycle. Curve 1320 represents difference between the output of the optical sensor switches from the ambient measurement cycle and the debris measurement cycle. The separation between the curves 1310 and 1320 is an offset applied by the oscilloscope. As shown in FIG. 13, the curve 1320 includes a spike 1325, which corresponds to a leave being detected by the optical sensor. By comparison with FIG. 12, the amplitude of the curve 1220 generally changes at a high frequency than the amplitude of the curve 1320.

Figure 14:
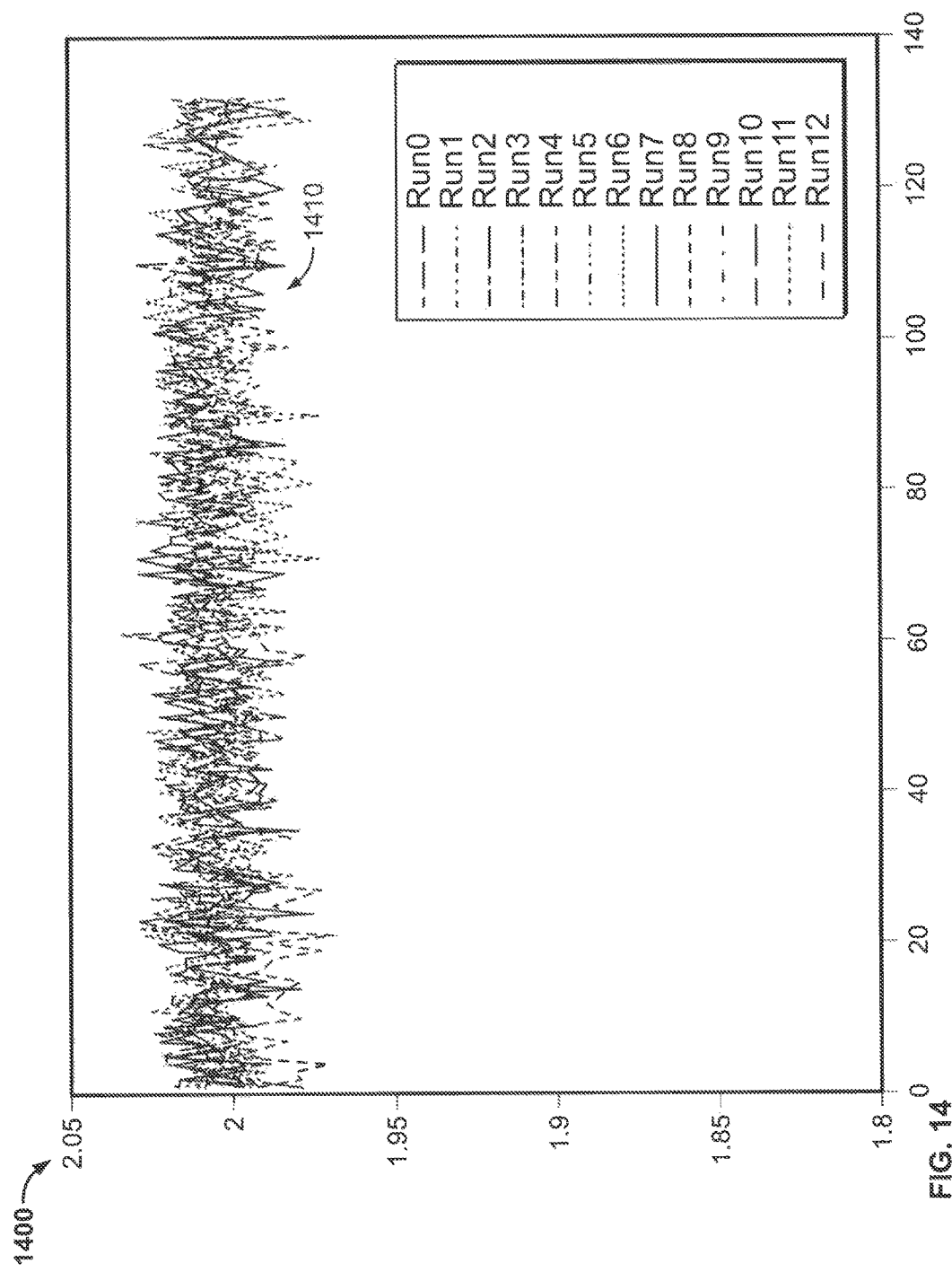
FIG. 14 shows a graph illustrating experimental results corresponding to a response of an embodiment of an optical sensor disposed within an intake pathway to cloudy water passing through the intake pathway without debris.

FIG. 14 shows a graph 1400 illustrating series of experimental results corresponding to a response of an embodiment of an optical sensor disposed within an intake pathway to cloudy water passing through the intake pathway without debris. The x-axis of the graph 1400 represents samples and the y-axis of the graph 1400 represents a voltage associated with the output of the optical sensor. The curves 1410 represent separate experiments/runs that were performed. As shown in the graph 1400, the response of the optical sensor, as provided by the curves 1410, is generally uniform indicating that the light detected by optical sensors is not being blocked by debris passing through the intake pathway.

Figure 15:
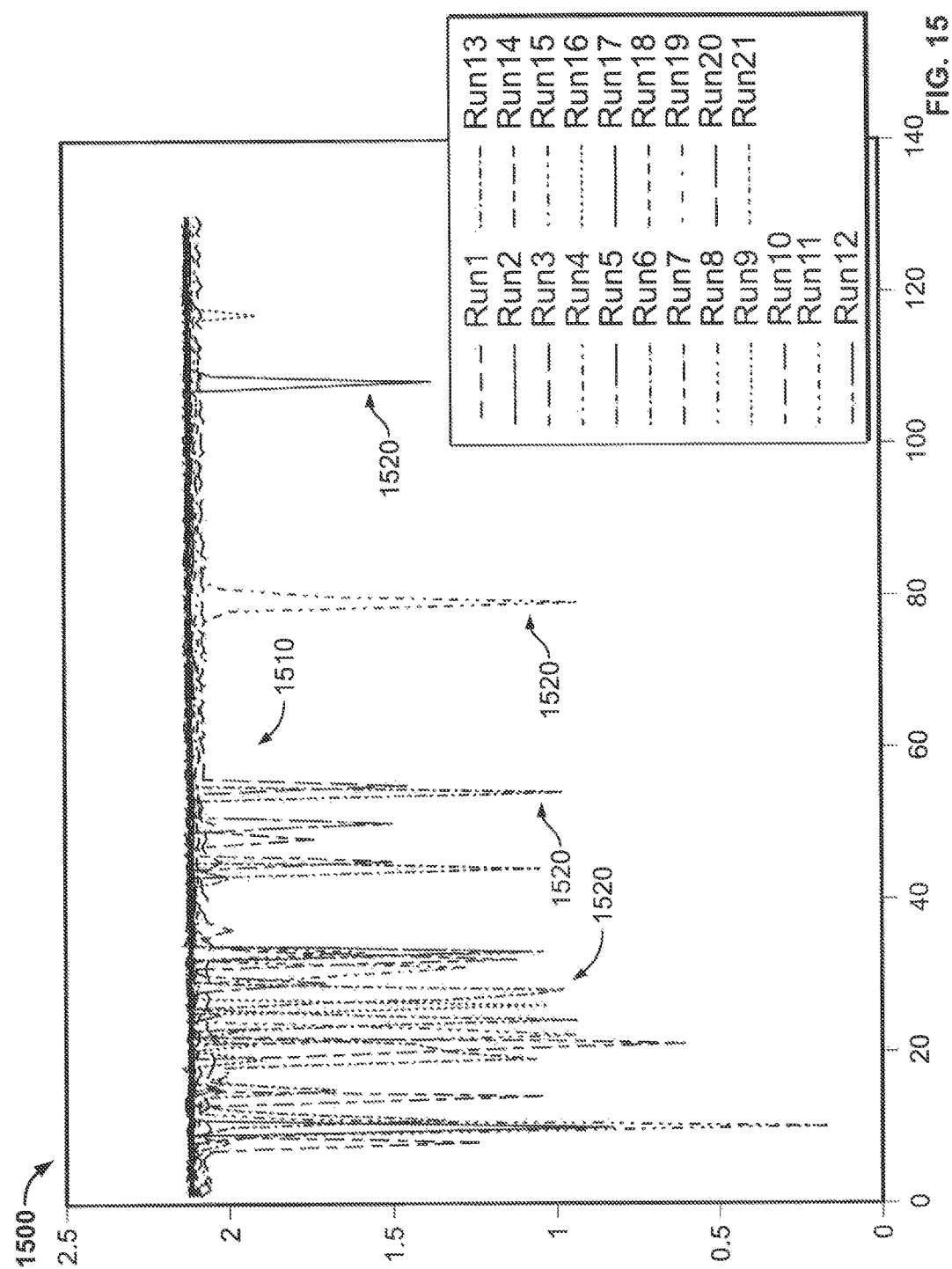
FIG. 15 shows a graph illustrating experimental results corresponding to a response of an embodiment of an optical sensor disposed within an intake pathway to cloudy water with debris in the form of leaves passing through the intake pathway.

FIG. 15 shows a graph 1500 illustrating a series of experimental results corresponding to a response of an embodiment of an optical sensor disposed within an intake pathway to cloudy water with debris in the form of leaves passing through the intake pathway. The x-axis of the graph 1500 represents samples and the y-axis of the graph 1500 represents a voltage associated with the output of the optical sensor. The curves 1510 represent separate experiments/runs that were performed. As shown in the graph 1500, the response of the optical sensor to leaves, as provided by the curves 1510, includes large spikes 1520 which corresponds to a detection of one or more leaves passing through the intake pathway (e.g., leaves passing through the intake pathway). By comparison, the response to the cloudy water with leaves passing through the intake pathway can be distinguished from the response to cloudy water based on a difference in amplitude of the voltage associated with the output of the optical sensor such that the voltage associated with the output of the optical sensor and/or the variability of frequency with which the voltage changes over a specified number of samples can form a signature that can be used to distinguish between types of debris passing through the intake pathway.

Figure 16:
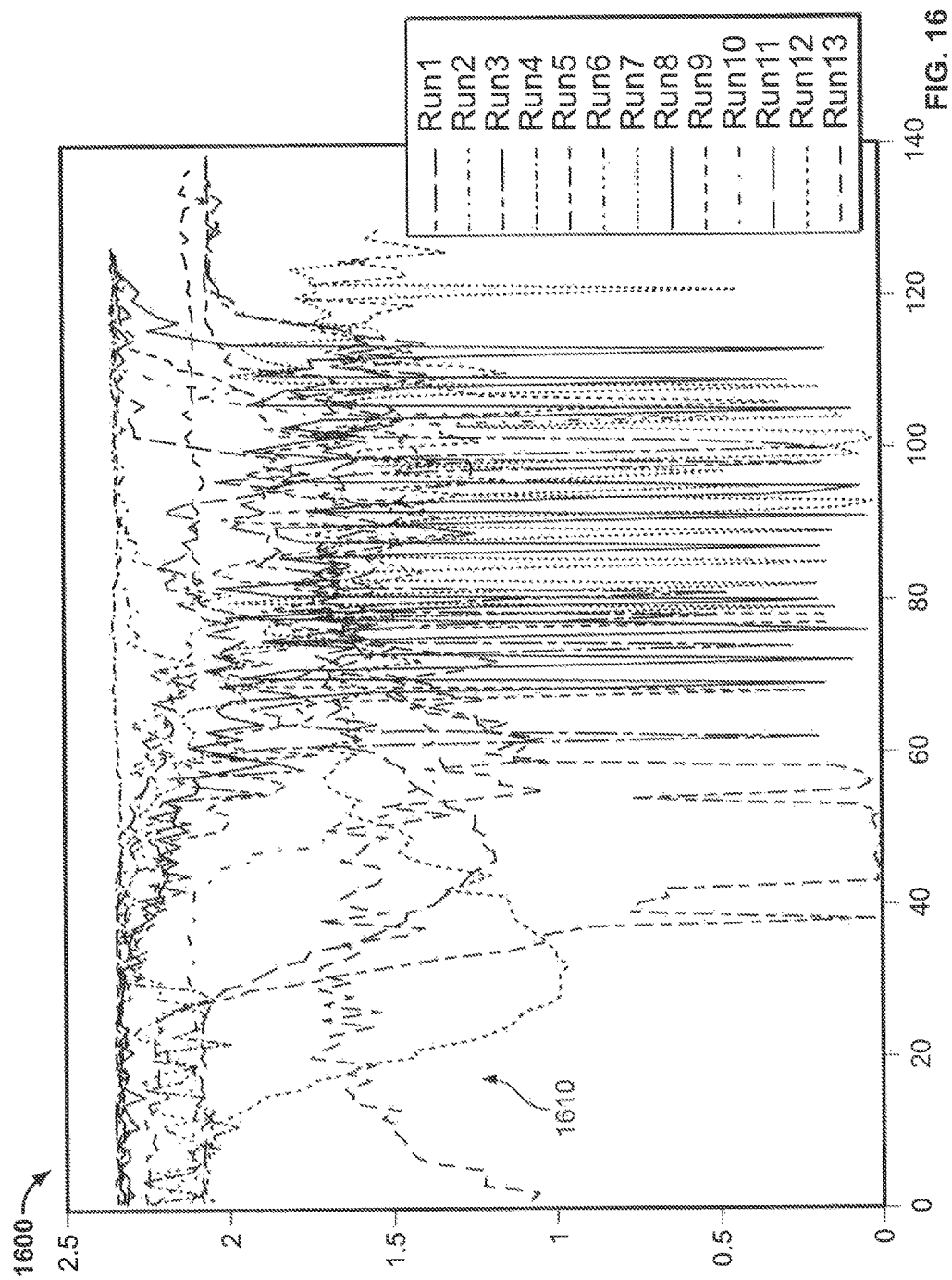
FIG. 16 shows a graph illustrating experimental results corresponding to a response of an embodiment of an optical sensor disposed within an intake pathway to cloudy water with debris in the form of sand passing through the intake pathway.

FIG. 16 shows a graph 1600 illustrating a series of experimental results corresponding to a response of an embodiment of an optical sensor disposed within an intake pathway to cloudy water with debris in the form of sand passing through the intake pathway. The x-axis of the graph 1600 represents samples and the y-axis of the graph 1600 represents a voltage associated with the output of the optical sensor. The curves 1610 represent separate experiments/runs that were performed. As shown in the graph 1600, the response of the optical sensor to sand, as provided by the curves 1610, varies from approximately one volt (1 V) to approximately two and three tenths volts (2.3 V) for the sample indicating a more sustained blockage or partial blockage of light as a result of the sand passing through the intake pathway. By comparison, the response to the cloudy water with sand passing through the intake pathway can be distinguished from the response to cloudy water and cloudy water with leaves based on a difference response illustrate by the voltage associated with the output of the optical sensor and a frequency with which the voltage changes such that the voltage associated with the output of the optical sensor over a specified number of samples can form a signature that can be used to distinguish between types of debris passing through the intake pathway.

In describing example embodiments, specific terminology is used for the sake of clarity. For purposes of description, each specific term is intended to at least include all technical and functional equivalents that operate in a similar manner to accomplish a similar purpose. Additionally, in some instances where a particular example embodiment includes a plurality of system elements, device components or method steps, those elements, components or steps may be replaced with a single element, component or step. Likewise, a single element, component or step may be replaced with a plurality of elements, components or steps that serve the same purpose. Moreover, while example embodiments have been shown and described with references to particular embodiments thereof, those of ordinary skill in the art will understand that various substitutions and alterations in form and detail may be made therein without departing from the scope of the invention. Further still, other embodiments, functions and advantages are also within the scope of the invention.

Example flowcharts are provided herein for illustrative purposes and are non-limiting examples of methods. One of ordinary skill in the art will recognize that example methods may include more or fewer steps than those illustrated in the example flowcharts, and that the steps in the example flowcharts may be performed in a different order than the order shown in the illustrative flowcharts.

What is claimed is:

1. A robotic pool cleaner configured to be submerged in water and to clean an immersed surface of a pool, the robotic pool cleaner comprising:
    an intake pathway, the intake pathway of the robotic pool cleaner being configured to receive water and debris as the robotic pool cleaner traverses the immersed surface of the pool;
    a processing device;
    an optical sensor operatively coupled to the processing device and positioned relative to the intake pathway, wherein the optical sensor comprises (a) a light emitter operable to output light into the intake pathway, and (b) a light detector operable to detect the light output by the light emitter subsequent to the light entering the intake pathway;
    wherein the processing device is programmed to determine whether a detectable level of debris is flowing through the intake pathway of the robotic pool cleaner based on an output of the optical sensor; and
    wherein the processing device is programmed to de-energize the light emitter to measure a contribution of ambient light in the output of the optical sensor during an ambient measurement cycle, and to energize the light emitter to measure a contribution of the light output by the light emitter and the ambient light in the output of the optical sensor during a debris measurement cycle.

2. The robotic pool cleaner of claim 1, further comprising a light emitter driver that energizes and de-energizes the light emitter in response to a light emitter sequence output by the processing device.

3. The robotic pool cleaner of claim 1, further comprising an amplifier configured to receive an electrical current corresponding to an intensity of light that is incident upon the light detector and to output an amplified electrical current.

4. The robotic pool cleaner of claim 3, further comprising an integrator configured to receive an amplified electrical current from the amplifier and to integrate the electrical current until the integrator receives a discharge signal from the processing device and to output an integrated electrical current.

5. The robotic pool cleaner of claim 4, further comprising an analog-to-digital converter configured to receive the integrated electrical current and to sample the integrated electric current in response to a synchronization signal received by the analog-to-digital converter from the processing device,
    wherein the analog-to-digital converter outputs a quantified value corresponding the light incident upon the light detector to the processing device, and the processing device is programmed to determine whether a detectable level of debris is flowing through the intake pathway based on the quantified value.

6. The robotic pool cleaner of claim 1, wherein the processing device is programmed to subtract the output of the ambient measurement cycle from the output of the debris measurement cycle to generate a differential mode output that substantially reduces an effect of the ambient light on a determination of whether a detectable level of debris is flowing through the intake pathway.

7. The robotic pool cleaner of claim 1, wherein upon a determination that a detectable level of debris is flowing through the intake pathway, the processing device is programmed to determine a type of the debris that is flowing through the intake pathway.

8. The robotic pool cleaner of claim 1, wherein the processing device is programmed to determine whether air is flowing through the intake pathway based on the output of the optical sensor.

9. The robotic pool cleaner of claim 1, wherein the processing device is programmed to determine a type of debris that is flowing through the intake pathway based on one or more signatures of the output of the optical sensor.

10. The robotic cleaner of claim 9, wherein the one or more signatures are based on at least one of an amplitude of the output, a variability of the output, a time varying characteristic of the output.

11. The robotic cleaner of claim 9, wherein the type of debris includes at least one of leaves or sand.

12. The robotic cleaner of claim 9, wherein the processing device is programmed to determine the type of debris based on the signature by comparing the output of the optical sensor to one or more signatures corresponding to different types of debris and identifying the type of debris based on the comparing.

13. The robotic pool cleaner of claim 1, wherein the processing device is programmed to implement a machine learning algorithm to classify the output of the optical sensor as a type of debris flowing through the intake pathway.

14. The robotic cleaner of claim 1, wherein the processing device is programmed to determine an out-of-water condition based on a comparison of the output of the optical sensor to one or more signatures.

15. The robotic cleaner of claim 1, wherein in response to determining that the detectable level of debris is flowing through the intake pathway, the processing device is configured to alter a movement of one or more wheels of the robotic pool cleaner.

16. The robotic cleaner of claim 1, wherein in response to determining that the detectable level of debris is flowing through the intake pathway, the processing device is configured to cause the pool cleaner to circle about a location of the pool associated with the detectable level of debris.

17. The robotic cleaner of claim 1, wherein in response to determining that the detectable level of debris is flowing through the intake pathway, the processing device is configured to increase a flow through the intake pathway.

18. The robotic cleaner of claim 1, wherein in response to determining that the detectable level of debris is flowing through the intake pathway, the processing device is configured to at least one of extend a cleaning time of a cleaning cycle, extend a cleaning time of future cleaning cycles, or increase a frequency with which the pool cleaner operates to clean the pool.

19. The robotic cleaner of claim 1, wherein in response to determining that the detectable level of debris is flowing through the intake pathway, the processing device is configured to learn locations at which debris is detected.

20. The robotic cleaner of claim 1, further comprising:
one or more image capturing devices operatively coupled to the processing device to capture images of surroundings of the pool cleaner as the pool cleaner traverses the immersed surface of the pool.

21. The robotic cleaner of claim 20, wherein the pool cleaner maps the pool based on the images captured by the one or more image capturing devices.

22. The robotic cleaner of claim 21, wherein the processing device associates locations at which debris accumulates with the map.

23. The robotic cleaner of claim 1, wherein in response to determining that undetectable level of debris is flowing through the intake pathway, the processing device is configured to at least one of increase a drive speed or torque of one or more wheels of the robotic pool cleaner or change a direction of travel of the robotic pool cleaner.

24. The robotic cleaner of claim 1, further comprising:
an amplifier operatively coupled to the optical sensor, the amplifier being configured to receive an electrical current output from the optical sensor and to output an amplified electrical current;
an integrator operatively coupled to the amplifier, the amplifier being configured to receive the amplified electrical current from the amplifier and to integrate the electrical current; and
an analog-to-digital converter operatively coupled to the integrator, the analog-to-digital converter being configured to receive the integrated electrical current, sample the integrated electric current, and output a quantified value corresponding the output of the optical sensor to the processing device,
wherein the processing device alternates between the ambient measurement cycle and the debris measurement cycle to control an operation of the optical sensor, the integrator, and the analog-to-digital converter.

25. The robotic pool cleaner of claim 24, wherein in response to at least one of the ambient measurement cycle or the debris measurement cycle, the processing device is programmed to:
control the integrator to integrate the electrical current for a first specified time period;
control the analog-to-digital converter to sample the integrated electrical current at a specified sample time;
discharge the integrator after the first specified time period, the integrator being discharged after or simultaneously with the specified sample time.

26. The robotic pool cleaner of claim 24, wherein in response to at least one of the ambient measurement cycle or the debris measurement cycle:
the integrator integrates the electrical current for a specified time period until the integrator receives a discharge signal from the processing device; and
the analog-to-digital converter receives a synchronization signal from the processing device, and in response to the synchronization signal, samples the integrated output of the integrator at a specified sample time, the specified sample time occurring before or simultaneously with the receipt of the discharge signal by the integrator.

27. A system for controlling a robotic pool cleaner configured to be submerged in water and to clean an immersed surface of a pool, the system comprising:
an optical sensor disposed relative to an intake pathway of the robotic pool cleaner, the intake pathway being configured to receive water and debris as the robotic pool cleaner traverses the immersed surface of the pool;
a non-transitory computer-readable medium including firmware; and
a processing device programmed to execute the firmware to determine whether a detectable level of debris is flowing through the intake pathway of the robotic pool cleaner based on the output of the optical sensor, wherein the processing device is programmed to control the optical sensor to measure a contribution of ambient light in the output of the optical sensor during an ambient measurement cycle, and to measure a contribution of light output by a light emitter and the ambient light in the output of the optical sensor during a debris measurement cycle.

28. The system of claim 27, wherein the processing device is programmed to subtract the output of the ambient measurement cycle from the output of the debris measurement cycle to generate a differential mode output that substantially reduces an effect of the ambient light on the determination of whether a detectable level of debris is flowing through the intake pathway.

29. The system of claim 27, wherein upon a determination that a detectable level of debris is flowing through the intake pathway, the processing device is programmed to determine the type of the debris that is flowing through the intake pathway.

30. The system of claim 27, wherein the processing device is programmed to determine whether air is flowing through the intake pathway based on the output of the optical sensor.

31. The system of claim 27, wherein the processing device is programmed to determine a type of debris that is flowing through the intake pathway based on a signature of the output of the optical sensor.

32. The system of claim 31, wherein the signature is based on at least one of an amplitude of the output, a variability of the output, and a time varying characteristic of the output.

33. The system of claim 31, wherein the processing device is programmed to determine the type of debris based on the signature by comparing the output of the optical sensor to one or more signatures corresponding to different types of debris and identifying the type of debris based on the comparing.

34. The system of claim 27, wherein the processing device is programmed to implement a machine learning algorithm to classify the output of the optical sensor as a type of debris flowing through the intake pathway.

35. The system of claim 27, wherein the processing device is programmed to determine an out-of-water condition based on a comparison of the output of the optical sensor to one or more signatures.

36. The system of claim 27, wherein in response to determining that the detectable level of debris is flowing through the intake pathway, the processing device is configured to alter a movement of one or more wheels of the robotic pool cleaner.

37. The system of claim 27, wherein in response to determining that the detectable level of debris is flowing through the intake pathway, the processing device is configured to cause the pool cleaner to circle about a location of the pool associated with the detectable level of debris.

38. The system of claim 27, wherein in response to determining that the detectable level of debris is flowing through the intake pathway, the processing device is configured to increase a flow through the intake pathway.

39. The system of claim 27, wherein in response to determining that the detectable level of debris is flowing through the intake pathway, the processing device is configured to at least one of extend a cleaning time of a cleaning cycle, extend a cleaning time of future cleaning cycles, or increase a frequency with which the pool cleaner operates to clean the pool.

40. The system of claim 27, further comprising:
one or more image capturing devices operatively coupled to the processing device to capture images of surroundings of the pool cleaner as the pool cleaner traverses the immersed surface of the pool.

41. The system of claim 40, wherein the pool cleaner maps the pool based on the images captured by the one or more image capturing devices and associates locations at which debris accumulates with the map.

42. The system of claim 27, wherein in response to determining that undetectable level of debris is flowing through the intake pathway, the processing device is configured to at least one of increase a drive speed or torque of one or more wheels of the robotic pool cleaner or change a direction of travel of the robotic pool cleaner.

43. The system of claim 27, wherein the processing device alternates between the ambient measurement cycle and the debris measurement cycle to control an operation of the robotic pool cleaner.

\* \* \* \* \*